United States Patent
Kawasoe et al.

(10) Patent No.: US 10,768,460 B2
(45) Date of Patent: Sep. 8, 2020

(54) DISPLAY DEVICE

(71) Applicant: Panasonic Intellectual Property Management Co., Ltd., Osaka (JP)

(72) Inventors: Yoshirou Kawasoe, Osaka (JP); Hiroya Tanaka, Osaka (JP); Katsumasa Ando, Osaka (JP); Kazuya Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/469,187

(22) PCT Filed: Dec. 21, 2017

(86) PCT No.: PCT/JP2017/045899
§ 371 (c)(1),
(2) Date: Jun. 13, 2019

(87) PCT Pub. No.: WO2018/123797
PCT Pub. Date: Jul. 5, 2018

(65) Prior Publication Data
US 2019/0353952 A1    Nov. 21, 2019

(30) Foreign Application Priority Data
Dec. 27, 2016   (JP) ................. 2016-253658

(51) Int. Cl.
*G02F 1/1333*    (2006.01)
(52) U.S. Cl.
CPC .............. *G02F 1/133308* (2013.01); *G02F 2001/13332* (2013.01); *G02F 2001/133314* (2013.01); *G02F 2001/133328* (2013.01)

(58) Field of Classification Search
CPC ......... G02F 1/133308; G02F 1/133608; G02F 1/133602; G02F 2001/13332;
(Continued)

(56) References Cited

U.S. PATENT DOCUMENTS

| 2011/0292315 A1 | 12/2011 | Bae et al. |
| 2014/0208626 A1 * | 7/2014 | Moon ................. G09F 9/30 40/729 |

(Continued)

FOREIGN PATENT DOCUMENTS

| JP | 2010-072207 | 4/2010 |
| JP | 2013-130282 | 7/2013 |

(Continued)

OTHER PUBLICATIONS

The Extended European Search Report dated Nov. 29, 2019 for the related European Patent Application No. 17885708.2.

(Continued)

*Primary Examiner* — Thoi V Duong
(74) *Attorney, Agent, or Firm* — McDermott Will & Emery LLP

(57) ABSTRACT

A display device includes a display module including a display panel that displays an image in a display area provided at a front, and a bezel surrounding an outer edge of the display module. The display area has a rectangular shape. The bezel includes a plurality of bezel portions having an elongated shape and disposed to correspond to respective four sides of the display area, and a joining member joining together two adjacent bezel portions of the plurality of bezel portions. The joining member is disposed in a position where the joining member overlaps the display module on a back side of the display module.

8 Claims, 12 Drawing Sheets

(58) Field of Classification Search
CPC ........ G02F 2001/133314; G02F 2001/133328; G02F 2001/133325; G02F 2001/133322; G02F 2001/133311; G02F 2201/46; G09F 9/00; H04N 5/64; H05K 5/02
See application file for complete search history.

(56) References Cited

U.S. PATENT DOCUMENTS

| | | |
|---|---|---|
| 2015/0277179 A1 | 10/2015 | Nishi et al. |
| 2016/0165747 A1 | 6/2016 | Iwata et al. |
| 2016/0178955 A1 | 6/2016 | Lin et al. |
| 2017/0038631 A1 | 2/2017 | Ma et al. |

FOREIGN PATENT DOCUMENTS

| | | |
|---|---|---|
| JP | 2014-027645 | 2/2014 |
| JP | 2015-026065 | 2/2015 |
| WO | 2016/155259 A1 | 10/2016 |

OTHER PUBLICATIONS

International Search Report of PCT application No. PCT/JP2017/045899 dated Mar. 27, 2018.

\* cited by examiner

DISPLAY DEVICE

CROSS-REFERENCE TO RELATED APPLICATIONS

This application is a U.S. national stage application of the PCT International Application No. PCT/JP2017/045899 filed on Dec. 21, 2017, which claims the benefit of foreign priority of Japanese patent application No. 2016-253658 filed on Dec. 27, 2016, the contents all of which are incorporated herein by reference.

TECHNICAL FIELD

The present disclosure relates to a display device including a bezel that surrounds a perimeter of a display module.

BACKGROUND ART

PTL 1 discloses a frame body (hereinafter also referred to as a "bezel") that surrounds an outer edge of a display module of a display device. The bezel includes four frame members, and adjacent ones of the four frame members are joined together at their ends.

CITATION LIST

Patent Literature

PTL 1: Unexamined Japanese Patent Publication No. 2014-27645

SUMMARY

The present disclosure provides a display device that is easily reduced in size, while maintaining a size of a display area.

A display device according to the present disclosure includes a display module including a display panel that displays an image in a display area provided at a front, and a bezel surrounding an outer edge of the display module. The display area has a rectangular shape. The bezel includes a plurality of bezel portions having an elongated shape and disposed to correspond to respective four sides of the display area, and a joining member joining together two adjacent bezel portions of the plurality of bezel portions. The joining member is disposed in a position where the joining member overlaps the display module on a back side of the display module.

The display device according to the present disclosure is easily reduced in size, while maintaining a size of the display area.

Figure 1:
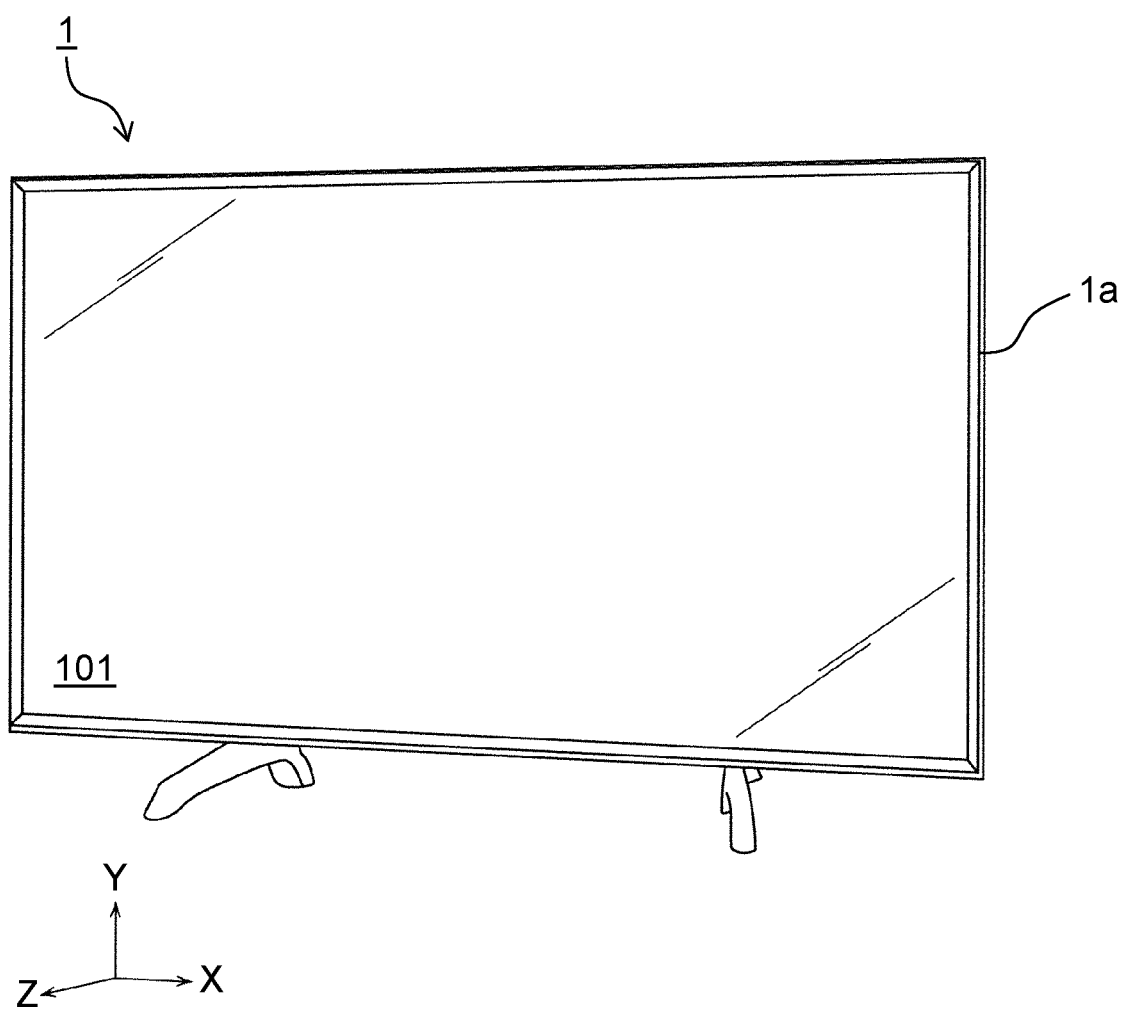
FIG. 1 is a perspective view schematically illustrating an example of an external appearance of a display device in a first exemplary embodiment.

DESCRIPTION OF EMBODIMENTS (Knowledge Underlying the Present Disclosure)

The inventors of the present application found that the following problem arises in association with the display device disclosed in PTL 1.

In the display device using the technique disclosed in PTL 1, the ends of adjacent ones of the four frame members are joined in positions lateral to the display module when the display device is viewed from a display surface side (hereinafter also referred to as "viewed from the front"). This prevents the bezel from having a sufficiently small width when the display device is viewed from the front, and thus causes a problem in that the ratio of a size of a display area to a size of the display device viewed from the front cannot be increased sufficiently. In other words, with the technique disclosed in PTL 1, it is difficult to reduce the size of the display device viewed from the front, while maintaining the size of the display area. The display device, however, is desired to be reduced further in size while maintaining the display area size.

The present disclosure provides a display device that is easily reduced in size, when viewed from the front, while maintaining the size of a display area.

Exemplary embodiments are described in detail below with reference to the drawings as appropriate. However, unnecessarily detailed descriptions may be omitted. For example, a detailed description of well-known matters, and a duplicate description of substantially identical structures may not be provided. This is to avoid unnecessary redundancy in the following description and to facilitate understanding of those skilled in the art.

The accompanying drawings and the exemplary embodiments described below are provided for those skilled in the art to fully understand the present disclosure, and merely illustrate an example of the present disclosure. Numerical values, shapes, materials, constituent elements, arrangement positions and connection modes of the constituent elements, and the like described in the following exemplary embodiments are merely examples, and therefore are not intended to limit the subject matters of the claims. Also, of the constituent elements in the following exemplary embodiments, constituent elements not recited in the independent claim indicating the broadest concept may be optionally added to the constituent elements described in the independent claim.

Furthermore, the drawings are not necessarily accurate illustrations, but are schematic views simplified as appropriate for a clear description of the present disclosure. In the drawings, the same reference numerals are assigned to substantially the same constituent elements, and a duplicate description of such constituent elements may be omitted or simplified.

Three axes, i.e., an X-axis, a Y-axis, and a Z-axis, are shown in the drawings, and the X, Y, and Z axes are used as required to describe the following exemplary embodiments. In the present exemplary embodiment, for the sake of convenience, a direction parallel (substantially parallel) to long sides of display area 101 of display device 1 installed onto a mounting surface is defined as an X-axis direction, a direction parallel (substantially parallel) to short sides of display area 101 is defined as a Y-axis direction, and a direction orthogonal to both the X-axis and the Y-axis is defined as a Z-axis direction. Also, in display device 1, a side relatively farther from the mounting surface is defined as a "top", a side relatively closer to the mounting surface is defined as a "bottom", and a direction from the bottom to the top is defined as a direction toward a positive side of the Y-axis. Further, a surface (i.e., a surface on which an image is displayed) of display area 101 is defined as a front, a surface of display area 101 opposite the front is defined as a rear or back, a direction from the rear to the front (i.e., a direction in which an image is displayed) is defined as a direction toward a positive side of the Z-axis, and a direction from left to right, as seen by the viewer facing the front of display area 101, is defined as a direction toward a positive side of the X-axis. In the following exemplary embodiments, respective components are described with reference to display device 1 placed on the mounting surface that is substantially parallel to a horizontal plane (i.e., an X-Z plane). For example, in description of display device 1 in a disassembled state that cannot be installed onto the mounting surface, the direction toward the positive side of the Y-axis is also defined as a direction toward the top, and a direction toward a negative side of the Y-axis is defined as a direction toward the bottom. Definitions for the X-axis and the Z-axis are also given in the same way as in the other drawings. These directions, however, are relative directions illustrated for the sake of convenience, and are not absolute directions. These directions should not be construed to limit the present disclosure.

First Exemplary Embodiment

Display device 1 described by way of example in a first exemplary embodiment is a liquid crystal display device including a liquid crystal display panel as display panel 60.

[1-1. Structure]

FIG. 1 is a perspective view schematically illustrating an example of an external appearance of display device 1 in the first exemplary embodiment.

As illustrated in FIG. 1, display device 1 has an external appearance of a typical flat-panel display, in which display module 10 (see FIG. 2) including display panel 60 is housed within casing 1a. Display device 1 is configured to display, in display area 101, a moving image or a still image based on an image signal.

Figure 2:
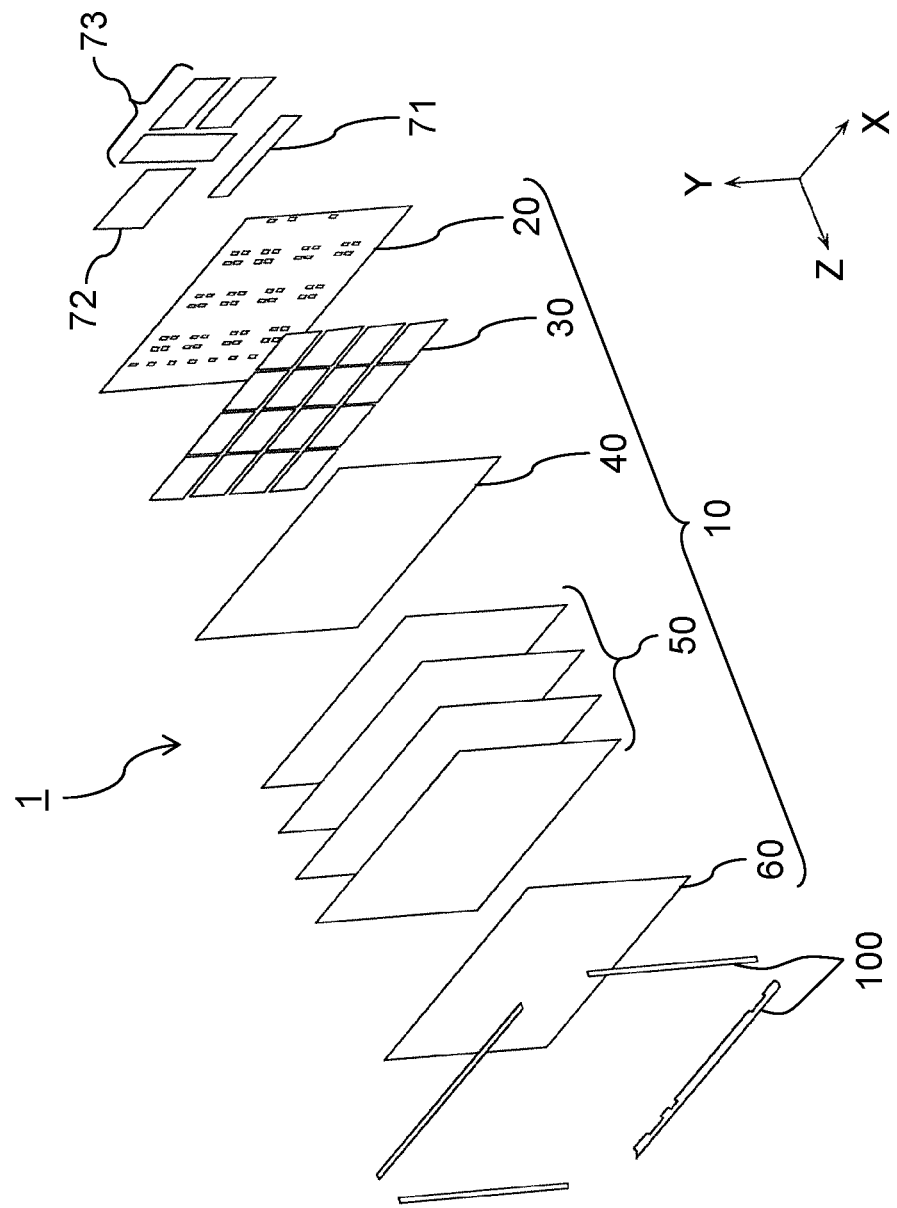
FIG. 2 is an exploded perspective view schematically illustrating an example of a structure of the display device in the first exemplary embodiment.

FIG. 2 is an exploded perspective view schematically illustrating an example of a structure of display device 1 in the first exemplary embodiment.

As illustrated in FIG. 2, display device 1 includes bezel 100, display module 10, connection terminal substrate 71, signal processing substrate 72, and power supply substrates 73. Display module 10 includes base plate 20, light source substrates 30, reflective sheet 40, various optical sheets 50, and display panel 60. Display device 1 further includes a rear cover (not shown) covering a rear side of base plate 20. In casing 1a (see FIG. 1) including the rear cover and bezel 100, display module 10, connection terminal substrate 71, signal processing substrate 72, and power supply substrates 73 are housed, thereby forming display device 1. Display device 1 may include, in addition to these members, a support member, a fastening member, a reinforcing member, and other members. Illustration of such optional members is omitted. Such members will be described as necessary.

Base plate 20 is a support substrate used as a base to which light source substrates 30, connection terminal substrate 71, signal processing substrate 72, and power supply substrates 73 are mounted. Base plate 20 is formed of a plate-shaped metal, for example.

In base plate 20, through-holes and screw holes, which are used to mount the various members, are provided. Base plate 20 also has openings, for example, used to electrically connect light source substrates 30 to each other with a cable running on the rear side of base plate 20 (i.e., on a negative side in the Z-axis direction), and to electrically connect light source substrates 30 to other substrates.

Light source substrates 30 are a backlight module provided on a rear side (i.e., on the negative side in the Z-axis direction) of display panel 60 to illuminate display panel 60 from the rear side. Light source substrates 30 have light sources on principal surfaces, which are surfaces of light source substrates 30 on the front side (i.e., on the positive side in the Z-axis direction), and illuminate the rear side of display panel 60 with light emitted by the light sources. Light source substrates 30 also have driver elements, which drive the respective light sources. Each of the light sources is a point light source formed of a light emitting diode (LED), for example.

Light source substrates 30 of the same (substantially the same) shape are mounted in the form of a matrix on a front (i.e., a surface on the positive side in the Z-axis direction) of base plate 20. Light source substrates 30 form a direct-lit backlight that illuminates display panel 60 from the rear.

Reflective sheet 40 is a sheet disposed on the principal surfaces (i.e., the surfaces on the positive side in the Z-axis direction) of light source substrates 30 to reflect light. Reflective sheet 40 has openings through which the respective light sources of light source substrates 30 pass. Of the light emitted from the respective light sources passing through the openings, part traveling in the rearward direction (i.e., toward the negative side in the Z-axis direction) is reflected by reflective sheet 40 toward the front (i.e., toward the positive side in the Z-axis direction). Reflective sheet 40 is formed of white synthetic resin, for example.

Optical sheets 50 are sheets disposed between display panel 60 and reflective sheet 40 and having various optical functions. Optical sheets 50 include, for example, a diffuser plate, which diffuses light emitted from light source substrates 30 to thereby further improve uniformity of brightness of the light, and a prism sheet, which causes the light emitted from light source substrates 30 to travel only frontwards (i.e., toward the positive side in the Z-axis direction) to thereby improve the brightness visually recognizable by the user. Each optical sheet 50 may be made of synthetic resin that has been molded to have a surface with a fine shape corresponding to the function, for example.

Display panel 60 is a liquid crystal panel for image display, including a matrix of pixels. Display panel 60 displays an image based on an image signal input into a drive circuit (not shown).

Bezel 100 is a support member that supports an outer edge of display module 10. Bezel 100 is formed of synthetic resin, for example.

Connection terminal substrate 71 is a circuit board where a terminal for receiving the image signal and an interface circuit are provided. Signal processing substrate 72 is a circuit board where a signal processing circuit for processing the image signal is provided. On signal processing substrate 72, there is also provided, for example, a circuit that generates, on the basis of the image signal, a control signal for controlling (light control) the brightness of the light sources of light source substrates 30. Power supply substrates 73 are a circuit board where a power supply circuit for supplying operating power to display device 1 is provided. Connection terminal substrate 71, signal processing substrate 72, and power supply substrates 73 are mounted on the rear of base plate 20.

Next, bezel 100 is described in detail.

Figure 3:
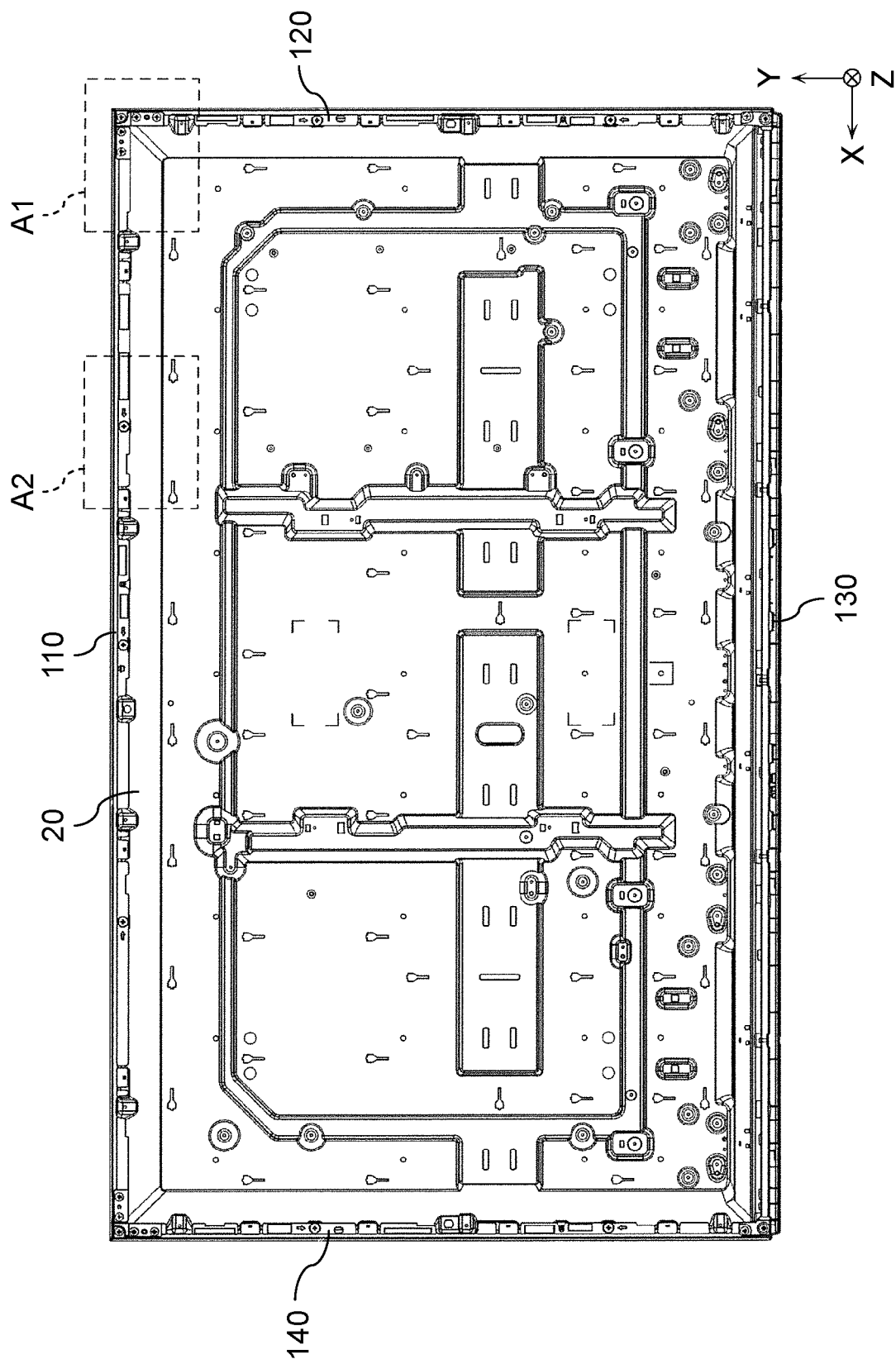
FIG. 3 is a plan view schematically illustrating an example of the structure, on a rear side, of the display device in the first exemplary embodiment.

FIG. 3 is a plan view schematically illustrating an example of the structure, on a rear side, of display device 1 in the first exemplary embodiment. FIG. 3 illustrates display device 1, viewed from the rear side, without the rear cover and the various substrates.

Figure 4:
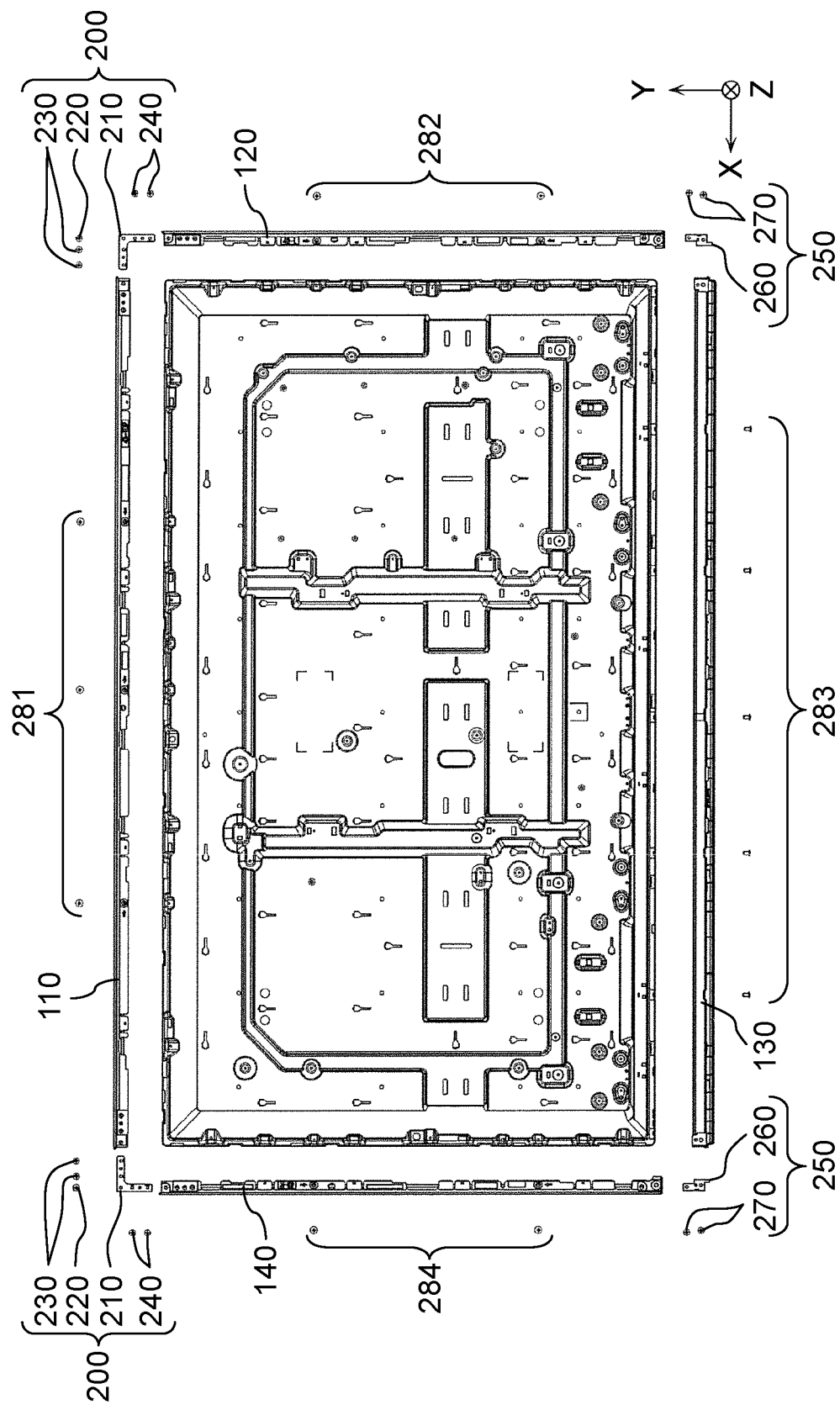
FIG. 4 is an exploded view schematically illustrating an example of the structure of the display device in the first exemplary embodiment.

FIG. 4 is an exploded view schematically illustrating an example of the structure of display device 1 in the first exemplary embodiment. FIG. 4 illustrates a state in which bezel 100 has been detached from base plate 20.

Figure 5:
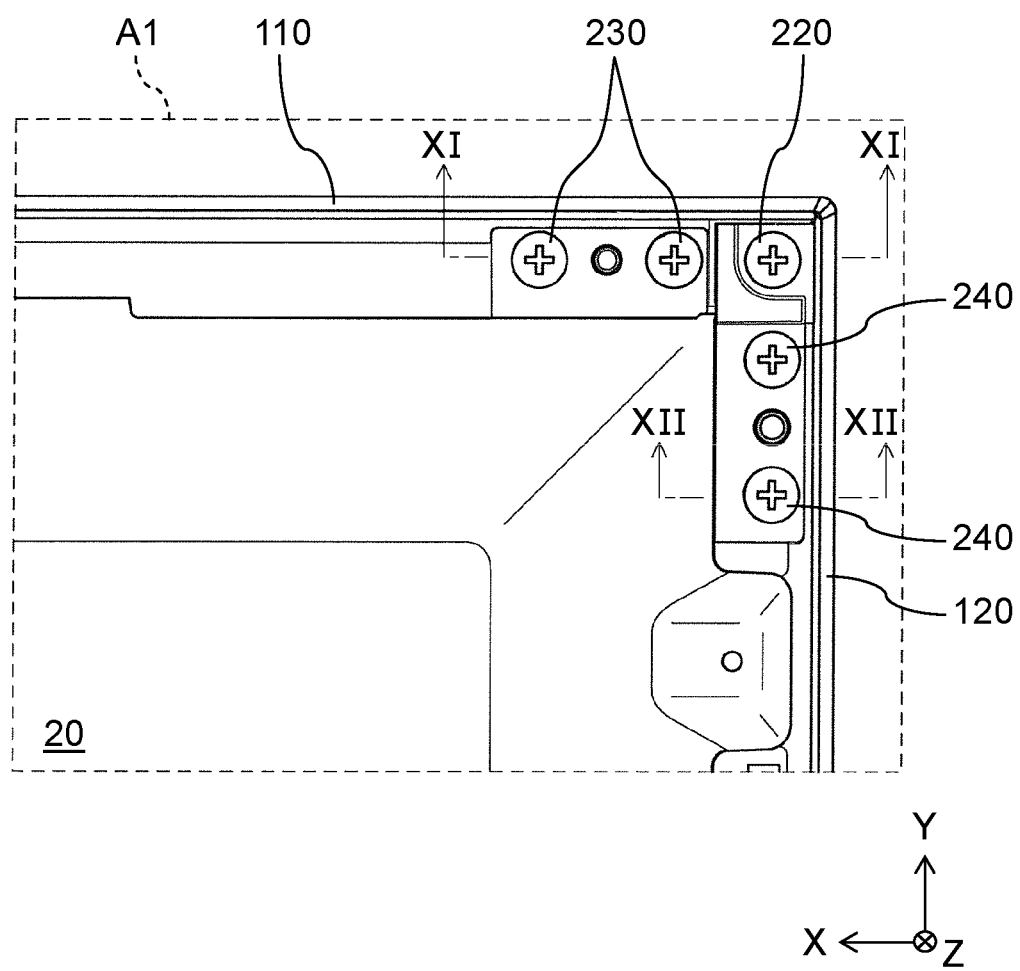
FIG. 5 is an enlarged view illustrating, on an enlarged scale, a part of the display device in the first exemplary embodiment.

FIG. 5 is an enlarged view illustrating, on an enlarged scale, a part of display device 1 in the first exemplary embodiment. FIG. 5 illustrates, on an enlarged scale, the part that is illustrated as region A1 in FIG. 3.

Figure 6:
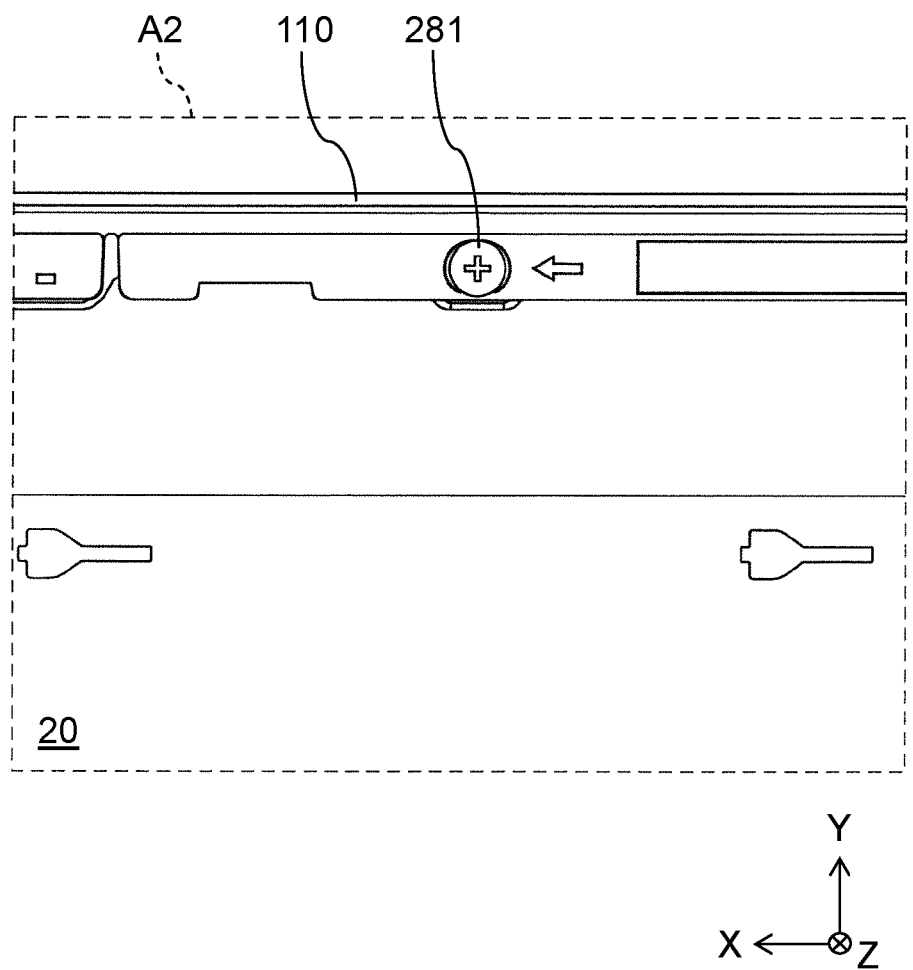
FIG. 6 illustrates, on an enlarged scale, another part of the display device in the first exemplary embodiment.

FIG. 6 is an enlarged view illustrating, on an enlarged scale, another part of display device 1 in the first exemplary embodiment. FIG. 6 illustrates, on an enlarged scale, the part that is illustrated as region A2 in FIG. 3.

For the sake of simplicity of description, the following describes a structure without light source substrates 30, reflective sheet 40, various optical sheets 50, display panel 60, the rear cover, and substrates 71 to 73.

As illustrated in FIGS. 3 to 6, bezel 100 includes a plurality of (for example, four) bezel portions 110 to 140, joining members 200, and joining members 250.

Bezel portions 110 to 140 are elongated members disposed in correspondence with respective four sides of display area 101. Specifically, in display device 1 installed on the mounting surface, bezel portion 110 and bezel portion 130 are elongated members extending in a horizontal direction (i.e., in the X-axis direction), while bezel portion 120 and bezel portion 140 are elongated members extending in a vertical direction (i.e., in the Y-axis direction).

Joining members 200 and joining members 250 are members each joining two adjacent bezel portions of bezel portions 110 to 140 together. Joining members 200 and joining members 250 join ends of two adjacent bezel portions of bezel portions 110 to 140 substantially at a right angle. In this way, rectangular bezel 100 surrounding the outer edge of display module 10 is formed.

Joining members 200 each include metal bracket 210 and connecting members 220 to 240. In two upper corners (i.e., a corner on the negative side in the X-axis direction and the positive side in the Y-axis direction, and a corner on the positive side in the X-axis direction and the positive side in the Y-axis direction) of display device 1, one end (i.e., an end on the negative side in the X-axis direction) of bezel portion 110 and an upper end (i.e., an end on the positive side in the Y-axis direction) of bezel portion 120 are joined together, and the other end (i.e., an end on the positive side in the X-axis direction) of bezel portion 110 and an upper end (i.e., an end on the positive side in the Y-axis direction) of bezel portion 140 are joined together by joining members 200.

Joining members 250 each include metal bracket 260 and connecting members 270. In two lower corners (i.e., a corner on the negative side in the X-axis direction and the negative side in the Y-axis direction, and a corner on the positive side in the X-axis direction and the negative side in the Y-axis direction) of display device 1, one end (i.e., an end on the negative side in the X-axis direction) of bezel portion 130 and a lower end (i.e., an end on the negative side in the Y-axis direction) of bezel portion 120 are joined together, and the other end (i.e., an end on the positive side in the X-axis direction) of bezel portion 130 and an lower end (i.e., an end on the negative side in the Y-axis direction) of bezel portion 140 are joined together by joining members 250.

As viewed from the rear (i.e., as viewed from the negative side in the Z-axis direction), the upper-right corner (i.e., the corner on the negative side in the X-axis direction and the positive side in the Y-axis direction) and the upper-left corner (i.e., the corner on the positive side in the X-axis direction and the positive side in the Y-axis direction) of display device 1 have substantially the same structure except that these corners are symmetrical with respect to a vertical line. The following therefore mainly describes the upper-right corner (i.e., the corner on the negative side in the X-axis direction and the positive side in the Y-axis direction) of display device 1 as viewed from the rear, and description of the upper-left corner (i.e., the corner on the positive side in the X-axis direction and the positive side in the Y-axis direction) of display device 1 will be omitted.

As illustrated in FIG. 4, bezel 100 is fixed, at its parts other than its corners, to the four sides of base plate 20 by connecting members 281 to 284. Specifically, as illustrated in FIG. 4, bezel 100 is fixed to an upper side (i.e., a longer side on the positive side in the Y-axis direction) of base plate 20 by the plurality of (for example, three) connecting members 281 at a plurality of (for example, three) points, other than the ends in the longitudinal direction, of bezel portion 110. Bezel 100 is also fixed to one shorter side (i.e., a shorter side on the negative side in the X-axis direction) of base plate 20 by the plurality of (for example, two) connecting members 282 at a plurality of (for example, two) points, other than the ends in the longitudinal direction, of bezel portion 120. Bezel 100 is also fixed to a lower side (i.e., a longer side on the negative side in the Y-axis direction) of base plate 20 by the plurality of (for example, five) connecting members 283 at a plurality of (for example, five) points, other than the ends in the longitudinal direction, of bezel portion 130. Bezel 100 is also fixed to the other shorter side (i.e., a shorter side on the positive side in the X-axis direction) of base plate 20 by the plurality of (for example, two) connecting members 284 at a plurality of (for example, two) points, other than the ends in the longitudinal direction, of bezel portion 140.

Connecting members 281 to 284 are metal screws, for example. Bezel portions 110 to 140 are fixed to base plate 20 by screwing of connecting members 281 to 284 passing through respective through-holes provided in bezel portions 110 to 140 into respective screw holes provided in base plate 20. As illustrated in FIG. 6, bezel portion 110, which is disposed on the upper side (i.e., the longer side on the positive side in the Y-axis direction) of base plate 20, is fixed at the rear side (i.e., the negative side in the Z-axis direction) of base plate 20 by connecting members 281 passing through bezel portion 110 from the rear side (toward the positive side in the Z-axis direction). Similarly, bezel portion 120, which is disposed on the one shorter side (i.e., the shorter side on the negative side in the X-axis direction) of base plate 20, is fixed at the rear side (i.e., the negative side in the Z-axis direction) of base plate 20 by connecting members 282 passing through bezel portion 120 from the rear side (toward the positive side in the Z-axis direction). Bezel portion 140, which is disposed on the other shorter side (i.e., the shorter side on the positive side in the X-axis direction) of base plate 20, is fixed at the rear side (i.e., the negative side in the Z-axis direction) of base plate 20 by connecting members 284 passing through bezel portion 140 from the rear side (toward the positive side in the Z-axis direction). On the other hand, bezel portion 130, which is disposed on the lower side (i.e., the longer side on the negative side in the Y-axis direction) of base plate 20, is fixed at a lower surface (i.e., a surface on the negative side in the Y-axis direction) of base plate 20 by connecting members 283 passing through bezel portion 130 from the lower side (toward the positive side in the Y-axis direction).

In the present exemplary embodiment, connecting members 220 to 240 of joining members 200 are used to join bezel portion 110 and bezel portion 120 as illustrated in FIG. 5, and are similarly used to join bezel portion 110 and bezel portion 140. That is, it is not necessary to use connecting members 220 to 240 to fix bezel 100 to base plate 20. Bezel 100 may be fixed to base plate 20 by connecting members 281 to 284 at positions away from the positions where joining members 200 are disposed.

Next, a specific structure of joining member 200 disposed at the corner in the upper-right (i.e., on the negative side in the X-axis direction and the positive side in the Y-axis direction) of display device 1 as viewed from the rear side is described with reference to FIG. 7. Joining member 200 disposed at the corner in the upper-left (i.e., on the positive side in the X-axis direction and the positive side in the Y-axis direction) of display device 1 as viewed from the rear side has substantially the same structure as joining member 200 of FIG. 7 disposed at the corner in the upper-right (i.e., on the negative side in the X-axis direction and the positive side in the Y-axis direction) of display device 1 except that a shape of metal bracket 210 is symmetrical to a shape of metal bracket 210 of joining member 200 of FIG. 7 with respect to a vertical line. As such, description of joining member 200 disposed at the corner in the upper-left of display device 1 will be omitted. As metal bracket 210 of joining member 200 disposed at the corner in the upper-left of display device 1, a metal bracket that has substantially the same shape as metal bracket 210 of joining member 200 disposed at the corner in the upper-right of display device 1 may be used by rotating such metal bracket 90 degrees counterclockwise.

Figure 7:
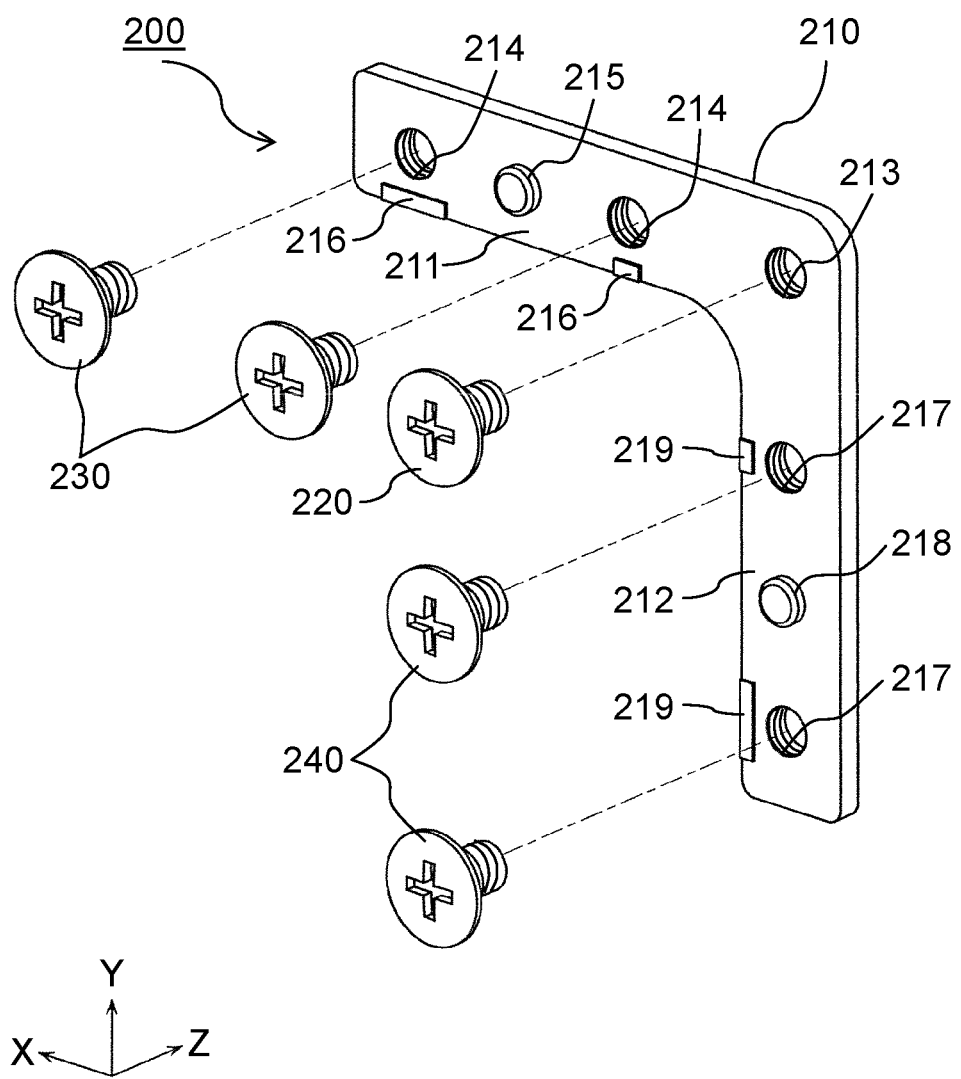
FIG. 7 is an exploded perspective view schematically illustrating an example of a structure of a joining member disposed on an upper side of the display device in the first exemplary embodiment.

FIG. 7 is an exploded perspective view schematically illustrating an example of the structure of joining member 200 disposed on the upper side (i.e., the longer side on the positive side in the Y-axis direction) of display device 1 in the first exemplary embodiment.

Joining member 200 includes metal bracket 210 in the form of an L-shaped plate, and connecting members 220 to 240. Connecting members 220 to 240 are metal stepped screws, for example.

Metal bracket 210 has two linear portions (i.e., linear portion 211 and linear portion 212), which form approximately a right angle in a single plane (an X-Y plane). Specifically, metal bracket 210 has linear portion 211 in the shape of a rectangular plate whose longitudinal direction extends along the X-axis direction, and linear portion 212 in the shape of a rectangular plate whose longitudinal direction extends along the Y-axis direction. Linear portion 211 and linear portion 212 are formed in the single plane (the X-Y plane).

Metal bracket 210 is a member for joining together bezel portion 110 disposed on the upper side (i.e., the longer side on the positive side in the Y-axis direction) of base plate 20 and bezel portion 120 disposed on the one shorter side (i.e., the shorter side on the negative side in the X-axis direction) of base plate 20. Linear portion 211 of metal bracket 210, which corresponds to bezel portion 110, is formed to have a shape such that linear portion 211 overlaps the one end, in the longitudinal direction, of bezel portion 110 (i.e., the end on the negative side in the X-axis direction) in the front-rear direction (i.e., in the Z-axis direction). Linear portion 212 of metal bracket 210, which corresponds to bezel portion 120, is formed to have a shape such that linear portion 212 overlaps the one end, in the longitudinal direction, of bezel portion 120 (i.e., the end on the positive side in the Y-axis direction) in the front-rear direction (i.e., in the Z-axis direction).

Metal bracket 210 has, in linear portion 211, a plurality of (for example, two) fixing holes 214 into which connecting members 230 are fixed. Metal bracket 210 also has, in linear portion 212, a plurality of (for example, two) fixing holes 217 into which connecting members 240 are fixed. Further, metal bracket 210 has fixing hole 213 into which connecting member 220 is fixed, at a corner of metal bracket 210 at which linear portion 211 and linear portion 212 meet. An internal thread is formed in an inner surface of each of fixing holes 213, 214, and 217.

Two fixing holes 214 are disposed laterally (i.e., on the positive side in the X-axis direction) of fixing hole 213 and aligned in linear portion 211 in a row in the horizontal direction (i.e., in the X-axis direction). Two fixing holes 217 are disposed below (i.e., on the negative side in the Y-axis direction) fixing hole 213 and aligned in linear portion 212 in a row in the vertical direction (i.e., in the Y-axis direction).

Metal bracket 210 also has protrusion 215 and protrusion 218 formed to project toward the rear side (i.e., the negative side in the Z-axis direction) and having a substantially cylindrical shape. Protrusion 215 is disposed in linear portion 211 between two fixing holes 214. Protrusion 218 is disposed in linear portion 212 between two fixing holes 217.

Further, metal bracket 210 has a plurality of (for example, two) projections 216 and a plurality of (for example, two) projections 219 formed to project toward the rear side (i.e., the negative side in the Z-axis direction). Two projections 216 are disposed in linear portion 211. Specifically, two projections 216 are respectively disposed below (i.e., on the negative side in the Y-axis direction) two fixing holes 214. The locations of two projections 216 are set in such a manner that two projections 216 are situated inside display area 101 when viewed in the front-rear direction (i.e., in the Z-axis direction) of display module 10. On the other hand, two projections 219 are disposed in linear portion 212. Specifically, two projections 219 are respectively disposed laterally (i.e., on the positive side in the X-axis direction) of two fixing holes 217. The locations of two projections 219 are set in such a manner that two projections 219 are situated inside display area 101 when viewed in the front-rear direction (i.e., in the Z-axis direction) of display module 10.

Connecting members 220 to 240 are members that connect two linear portions 211 and 212 of metal bracket 210 and two adjacent bezel portions (for example, bezel portion 110 and bezel portion 120) of bezel portions 110 to 140 together, with linear portions 211 and 212 and the two adjacent bezel portions being disposed to overlap each other in the front-rear direction (i.e., in the Z-axis direction) of display module 10. Specifically, connecting members 230 connect bezel portion 110 and metal bracket 210 together by screwing into fixing holes 214 of metal bracket 210 with linear portion 211 of metal bracket 210 and bezel portion 110 being disposed to overlap each other in the front-rear direction (i.e., in the Z-axis direction) of display module 10. Connecting members 240 connect bezel portion 120 and metal bracket 210 together by screwing into fixing holes 217 of metal bracket 210 with linear portion 212 of metal bracket 210 and bezel portion 120 being disposed to overlap each other in the front-rear direction (i.e., in the Z-axis direction) of display module 10. Connecting member 220 connects bezel portion 110, bezel portion 120, and metal bracket 210 together by screwing into fixing hole 213 of metal bracket 210 with the corner of metal bracket 210, the end (i.e., the end on the negative side in the X-axis direction) of bezel portion 110, and the end (i.e., the end on the positive side in the Y-axis direction) of bezel portion 120 being disposed to overlap one another in the front-rear direction (i.e., in the Z-axis direction) of display module 10. In this manner, metal bracket 210 and connecting members 220 to 240 join adjacent bezel portions 110 and 120 together.

Next, the following describes a method for assembling two bezel portions 110 and 120 and base plate 20. Connection of bezel portion 110 and metal bracket 210 is described first, and then connection of metal bracket 210, to which bezel portion 110 has been connected, and bezel portion 120 is described.

Figure 8:
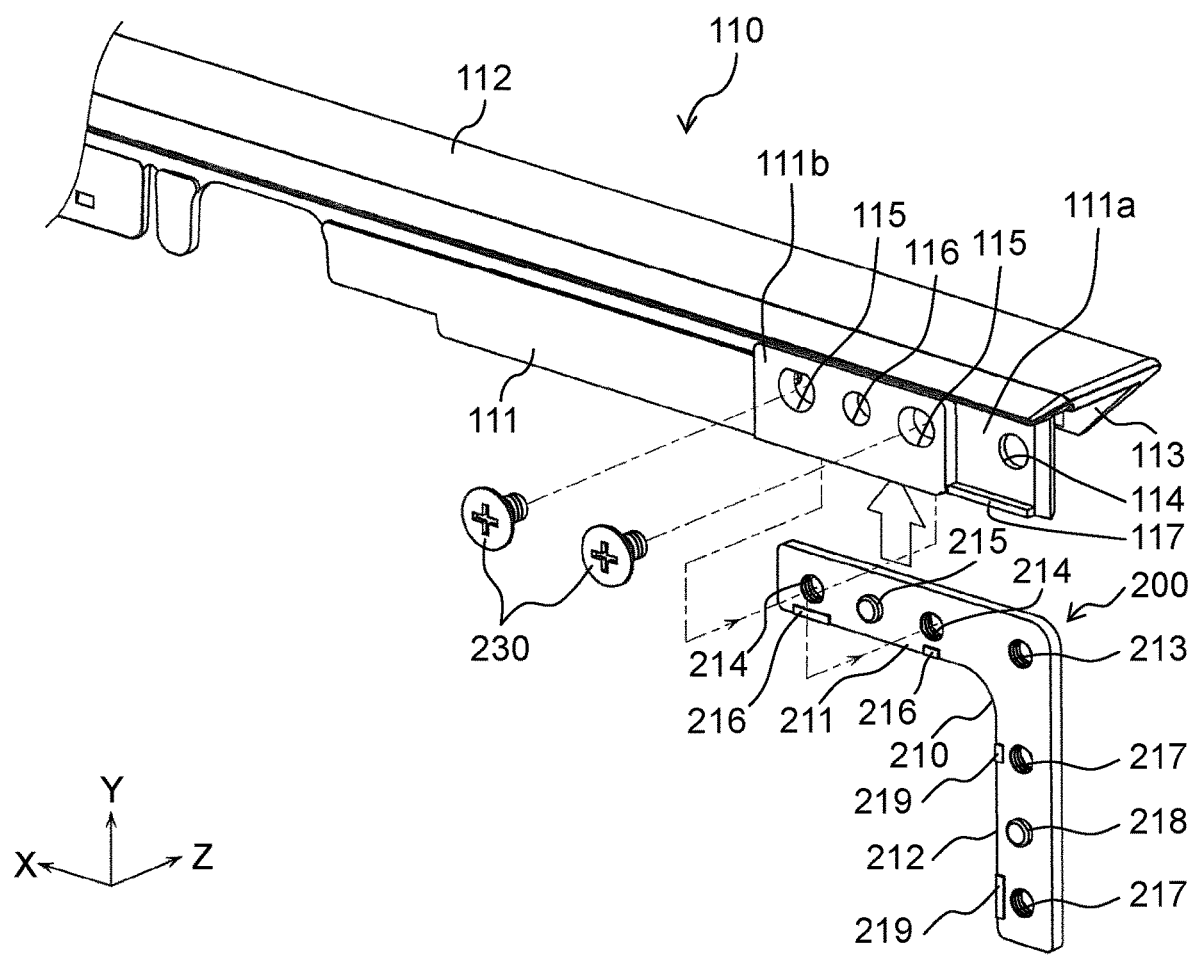
FIG. 8 schematically illustrates how a bezel portion disposed on the upper side of the display device and a metal bracket are connected together in the first exemplary embodiment.

FIG. 8 schematically illustrates how bezel portion 110, which is disposed on the upper side (i.e., the longer side on the positive side in the Y-axis direction) of display device 1, and metal bracket 210 are connected together in the first exemplary embodiment.

Figure 9:
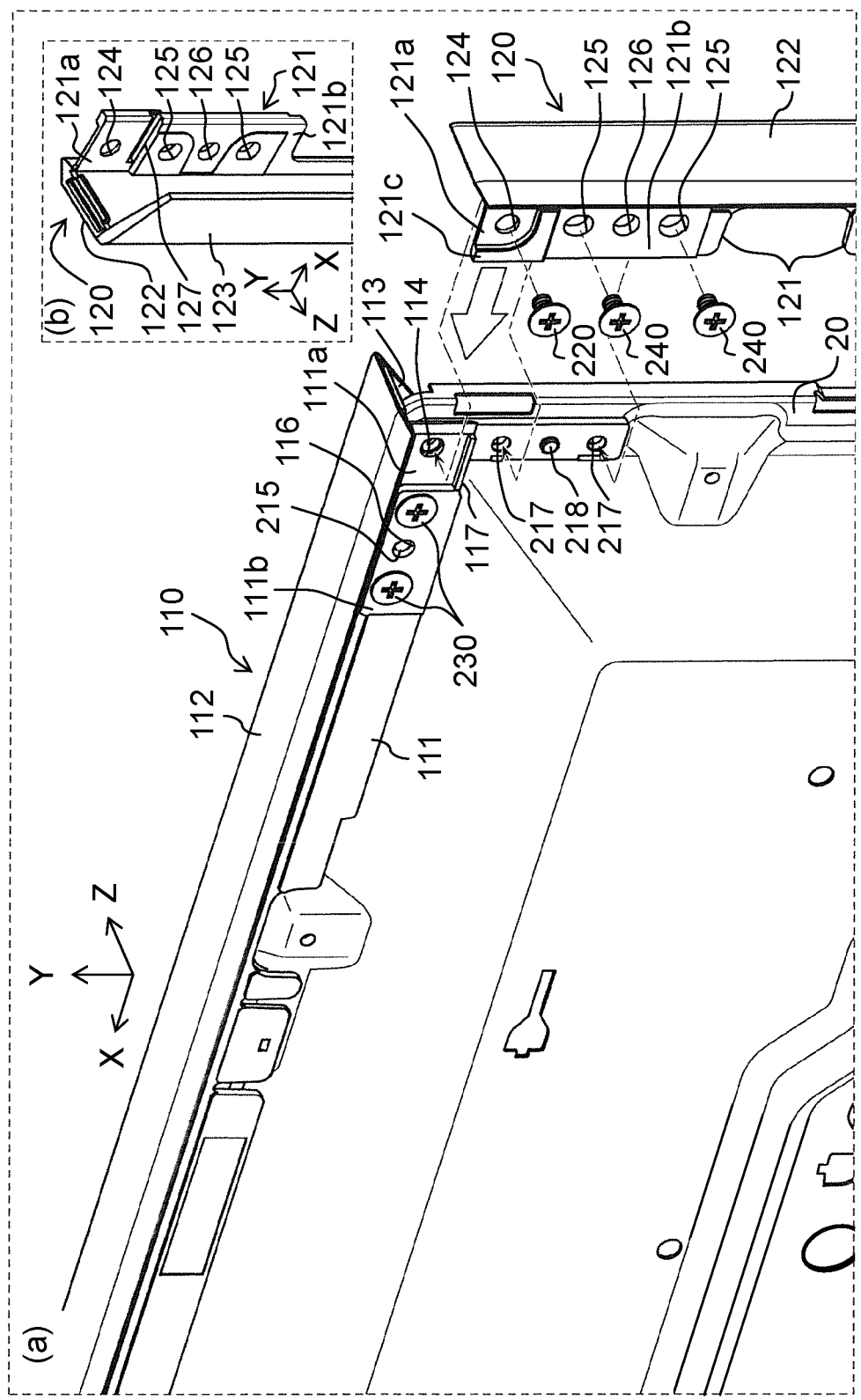
FIG. 9 schematically illustrates how the bezel portion disposed on the upper side of the display device and a bezel portion disposed on one shorter side of the display device are joined together by the joining member in the first exemplary embodiment.

FIG. 9 schematically illustrates how bezel portion 110, which is disposed on the upper side (i.e., the longer side on the positive side in the Y-axis direction) of display device 1, and bezel portion 120, which is disposed on one shorter side (i.e., a shorter side on the negative side in the X-axis direction) of display device 1, are joined together by joining member 200 in the first exemplary embodiment. Part (b) of FIG. 9 is a perspective view of bezel portion 120 viewed from the front side (i.e., the positive side in the Z-axis direction).

Figure 10:
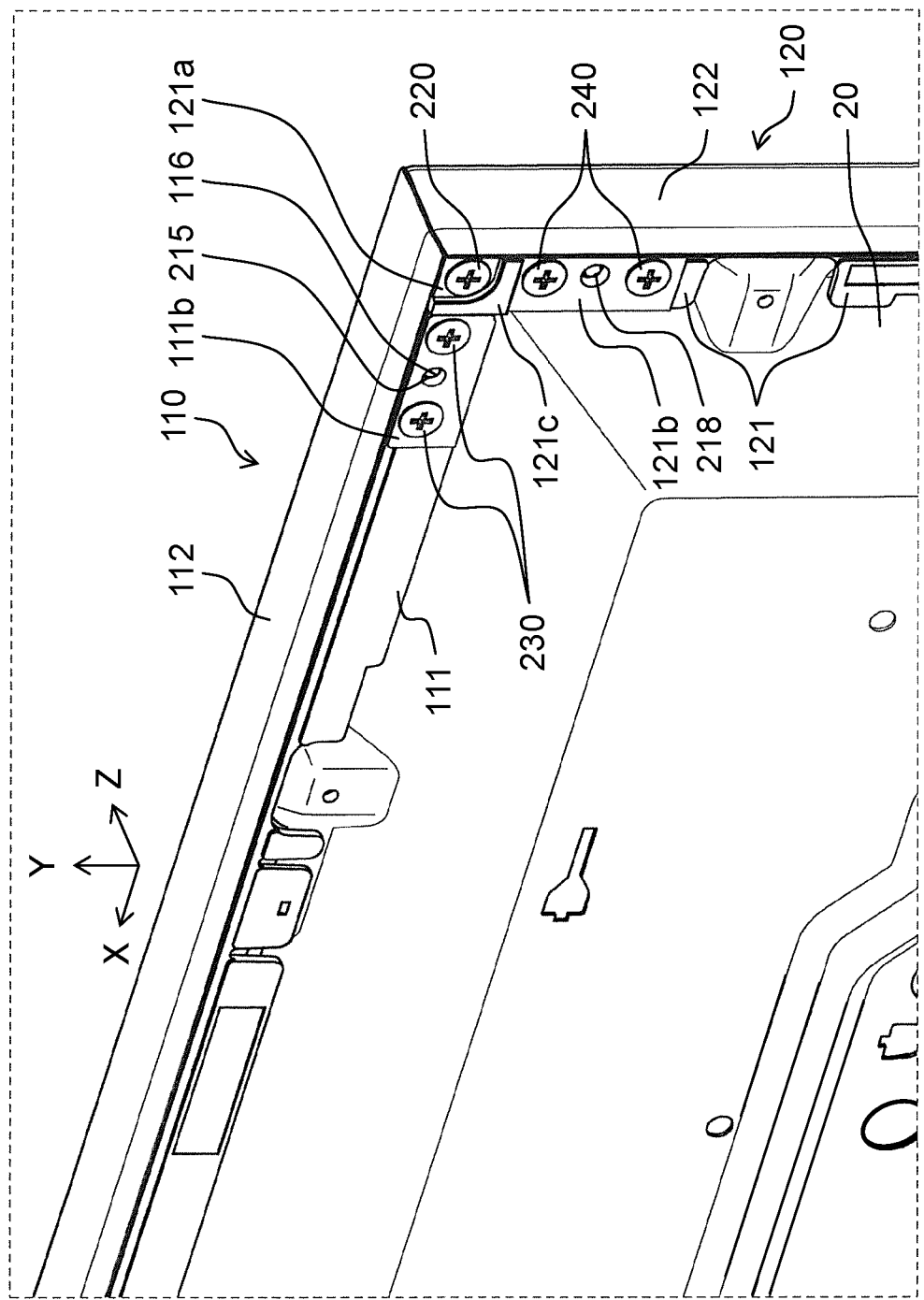
FIG. 10 is an enlarged view schematically illustrating an example of an external appearance of a corner of a bezel of the display device in the first exemplary embodiment.

FIG. 10 is an enlarged view of a corner of bezel 100 of display device 1 in the first exemplary embodiment. FIG. 10 illustrates, on an enlarged scale, the corner (i.e., the corner in the upper-right end when display device 1 is viewed from the rear side, that is, the corner on the negative side in the X-axis direction and the positive side in the Y-axis direction) of bezel 100 that has been attached to base plate 20.

As illustrated in FIG. 8, bezel portion 110 disposed on the upper side (i.e., the longer side on the positive side in the Y-axis direction) of base plate 20 has rear portion 111, lateral portion 112, and front portion 113. Rear portion 111 is a plate-shaped member disposed at a rear side (i.e., the negative side in the Z-axis direction) of bezel portion 110. Lateral portion 112 is a plate-shaped member disposed at an upper surface (i.e., a lateral surface on the positive side in the Y-axis direction) of bezel portion 110. Lateral portion 112 forms an upper-side lateral surface (i.e., an upper surface) of the casing of display device 1. Front portion 113 is a plate-shaped member disposed at a front side (i.e., the positive side in the Z-axis direction) of bezel portion 110. Front portion 113 forms a frame part disposed on the upper side (i.e., the longer side on the positive side in the Y-axis direction) of display area 101 (see FIG. 1) at the front of display device 1.

Rear portion 111 is formed to project downwardly (toward the negative side in the Y-axis direction) from an end, on a rear side (i.e., on the negative side in the Z-axis direction), of lateral portion 112. Front portion 113 is formed to project downwardly (toward the negative side in the Y-axis direction) from an end, on a front side (i.e., on the positive side in the Z-axis direction), of lateral portion 112. Rear portion 111, lateral portion 112, and front portion 113 are members having an elongated plate shape extending in the horizontal direction (i.e., in the X-axis direction).

Rear portion 111 and lateral portion 112 are connected in such a manner that their respective width directions are substantially perpendicular to each other. Lateral portion 112 and front portion 113 are connected in such a manner that their respective width directions are substantially perpendicular to each other. Hence, bezel portion 110 has a substantially C shape when viewed in the longitudinal direction (i.e., in the X-axis direction), allowing one (i.e., the upper side, that is, the longer side on the positive side in the Y-axis direction) of the four sides of base plate 20 to be disposed between front portion 113 and rear portion 111.

As illustrated in FIG. 8, rear portion 111 of bezel portion 110 has through-holes at the one end, in the longitudinal direction (i.e., in the X-axis direction), of bezel portion 110 (i.e., at the end on the negative side in the X-axis direction). The through-holes are aligned in a row in the longitudinal direction (i.e., in the X-axis direction). Rear portion 111 of bezel portion 110 has, as the through-holes, first through-hole 114 disposed at an outermost end in the longitudinal direction (i.e., the end on the negative side in the X-axis direction), and two second through-holes 115 disposed inwardly of first through-hole 114 in the longitudinal direction (i.e., ahead of first through-hole 114 in the direction toward the positive side of the X-axis). Rear portion 111 of bezel portion 110 further has third through-hole 116 between two second through-holes 115. Specifically, the through-holes are aligned in a row in rear portion 111 of bezel portion 110 in the longitudinal direction (i.e., in the direction toward the positive side of the X-axis) in the order of first through-hole 114, second through-hole 115, third through-hole 116, and second through-hole 115 from the one end (i.e., the end on the negative side in the X-axis direction) in the longitudinal direction (i.e., in the X-axis direction), and pass through rear portion 111 in a thickness direction (i.e., in the Z-axis direction).

As illustrated in FIG. 8, bezel portion 110 is connected to metal bracket 210 by connecting members 230 at rear portion 111 of bezel portion 110. Specifically, second portion 111b where second through-holes 115 of bezel portion 110 are formed, and linear portion 211 of metal bracket 210 are first disposed to overlap each other in such a manner that fixing holes 214 of linear portion 211 and second through-holes 115 coincide with each other in the front-rear direction (i.e., in the Z-axis direction). At this time, bezel portion 110 and metal bracket 210 are disposed to overlap each other in the front-rear direction (i.e., in the Z-axis direction) in such a manner that second portion 111b of bezel portion 110 is placed on the rear side (i.e., on the negative side in the Z-axis direction) of linear portion 211 of metal bracket 210. In this state, connecting members 230 are passed through second through-holes 115 from the rear side (toward the positive side in the Z-axis direction) to screw into fixing holes 214 of metal bracket 210. In this way, rear portion 111 of bezel portion 110 and metal bracket 210 are connected together.

At this time, protrusion 215 formed on linear portion 211 of metal bracket 210 fits into third through-hole 116 from a front side (i.e., from the positive side in the Z-axis direction) of second portion 111b. In the present exemplary embodiment, protrusion 215 of linear portion 211 and third through-hole 116 are formed in such a manner that when protrusion 215 fits into third through-hole 116, second through-holes 115 and fixing holes 214 of metal bracket 210 coincide with each other in the front-rear direction (i.e., in the Z-axis direction), and first through-hole 114 and fixing hole 213 of metal bracket 210 coincide with each other in the front-rear direction (i.e., in the Z-axis direction). Therefore, when metal bracket 210 is connected to bezel portion 110, metal bracket 210 is easily placed in the predetermined position on bezel portion 110 (i.e., the position where the through-holes and the respective corresponding fixing holes coincide with each other in the front-rear direction (i.e., in the Z-axis direction)) just by fitting protrusion 215 into third through-hole 116.

Next, as illustrated in part (a) of FIG. 9, base plate 20 is disposed between rear portion 111 and front portion 113 of bezel portion 110. In this state, bezel portion 120 is fixed to metal bracket 210 by connecting member 220 and connecting members 240. In this way, bezel portion 110 and bezel portion 120 are joined together.

As illustrated in FIG. 9, like bezel portion 110, bezel portion 120 disposed on the one shorter side (i.e., the shorter side on the negative side in the X-axis direction) of base plate 20 has rear portion 121, lateral portion 122, and front portion 123. Rear portion 121 is a plate-shaped member disposed at a rear side (i.e., the negative side in the Z-axis direction) of bezel portion 120. Lateral portion 122 is a plate-shaped member disposed at one lateral surface (i.e., a lateral surface on the negative side in the X-axis direction) of bezel portion 120. Lateral portion 122 forms one lateral surface (i.e., a lateral surface at the shorter side of display device 1 on the negative side in the X-axis direction) of the casing of display device 1. Front portion 123 is a plate-shaped member disposed at a front side (i.e., the positive side in the Z-axis direction) of bezel portion 120. Front portion 123 forms a frame part disposed on one shorter side (i.e., the shorter side on the negative side in the X-axis direction) of display area 101 (see FIG. 1) at the front of display device 1.

Rear portion 121 is formed to project sideways (toward the positive side in the X-axis direction) from an end, on a rear side (i.e., on the negative side in the Z-axis direction), of lateral portion 122. Front portion 123 is formed to project sideways (toward the positive side in the X-axis direction) from an end, on a front side (i.e., on the positive side in the Z-axis direction), of lateral portion 122. Rear portion 121, lateral portion 122, and front portion 123 are members having an elongated plate shape extending in the vertical direction (i.e., in the Y-axis direction).

As illustrated in part (b) of FIG. 9, in bezel portion 120, like rear portion 111, lateral portion 112, and front portion 113 of bezel portion 110, rear portion 121 and lateral portion 122 are connected in such a manner that their respective width directions are substantially perpendicular to each other, and lateral portion 122 and front portion 123 are connected in such a manner that their respective width directions are substantially perpendicular to each other. Hence, bezel portion 120 has a substantially C shape when viewed in the longitudinal direction (i.e., in the Y-axis direction), allowing another one (i.e., the shorter side on the negative side in the X-axis direction) of the four sides of base plate 20 to be disposed between front portion 123 and rear portion 121.

Although illustration is not provided, bezel portion 140 has substantially the same structure as bezel portion 120 except that bezel portion 140 is symmetrical to bezel portion 120 with respect to a vertical line. Thus, although a detailed description is not provided, bezel portion 140 has a substantially C shape when viewed in the longitudinal direction (i.e., in the Y-axis direction), allowing another one (i.e., the shorter side on the positive side in the X-axis direction) of the four sides of base plate 20 to be disposed between a front portion and a rear portion. Similarly, bezel portion 130 has substantially the same structure as bezel portion 110 except that bezel portion 130 is symmetrical to bezel portion 110 with respect to a horizontal line, and that connecting members 283 are connected in a different direction. Hence, although a detailed description is not provided, bezel portion 130 has a substantially C shape when viewed in the longitudinal direction (i.e., in the X-axis direction), allowing the remaining one (i.e., the lower side, that is, the longer side on the negative side in the Y-axis direction) of the four sides of base plate 20 to be disposed between a front portion and a rear portion.

As illustrated in part (a) of FIG. 9, rear portion 121 of bezel portion 120, like rear portion 111 of bezel portion 110, has through-holes at the one end, in the longitudinal direction (i.e., in the Y-axis direction), of bezel portion 120 (i.e., at the end on the positive side in the Y-axis direction). The through-holes are aligned in a row in the longitudinal direction (i.e., in the Y-axis direction). Rear portion 121 of bezel portion 120 has, as the through-holes, first through-hole 124 disposed at an outermost end in the longitudinal direction (i.e., the end on the positive side in the Y-axis direction), and two second through-holes 125 disposed below (i.e., on the negative side in the Y-axis direction) first through-hole 124. Rear portion 121 of bezel portion 120 further has third through-hole 126 between two second through-holes 125. Specifically, the through-holes are aligned in a row in rear portion 121 of bezel portion 120 in the longitudinal direction (i.e., in the direction toward the negative side of the Y-axis) in the order of first through-hole 124, second through-hole 125, third through-hole 126, and second through-hole 125 from the one end (i.e., the end on the positive side in the Y-axis direction) in the longitudinal direction (i.e., in the Y-axis direction), and pass through rear portion 121 in a thickness direction (i.e., in the Z-axis direction).

As illustrated in FIG. 9, bezel portion 120 is connected to metal bracket 210 by connecting members 240 at rear portion 121 of bezel portion 120. Specifically, second portion 121b where second through-holes 125 of bezel portion 120 are formed, and linear portion 212 of metal bracket 210 are first disposed to overlap each other in such a manner that fixing holes 217 of linear portion 212 and second through-holes 125 coincide with each other in the front-rear direction (i.e., in the Z-axis direction). At this time, bezel portion 120 and metal bracket 210 are disposed to overlap each other in the front-rear direction (i.e., in the Z-axis direction) in such a manner that second portion 121b of bezel portion 120 is placed on a rear side (i.e., on the negative side in the Z-axis direction) of linear portion 212 of metal bracket 210. In this state, connecting members 240 are passed through second through-holes 125 from the rear side (toward the positive side in the Z-axis direction) to screw into fixing holes 217 of metal bracket 210. In this way, rear portion 121 of bezel portion 120 and metal bracket 210 are connected together.

At this time, first portion 121a, where first through-hole 124 of bezel portion 120 is formed, overlaps the corner of metal bracket 210, with first portion 121a and first portion 111a, where first through-hole 114 of bezel portion 110 is formed, overlapping each other. First through-hole 114 of bezel portion 110, first through-hole 124 of bezel portion 120, and fixing hole 213 of metal bracket 210 (see FIG. 7) thus overlap one another in the front-rear direction (i.e., in the Z-axis direction). In this state, connecting member 220 is passed through first through-hole 114 of bezel portion 110 and first through-hole 124 of bezel portion 120 from the rear side (toward the positive side in the Z-axis direction) to screw into fixing hole 213 of metal bracket 210 (see FIG. 7). Consequently, rear portion 121 of bezel portion 120 and metal bracket 210 are connected together. In this way, the one end (i.e., the end on the negative side in the X-axis direction) of bezel portion 110, and the one end (i.e., the end on the positive side in the Y-axis direction) of bezel portion 120 are fixed to the corner of metal bracket 210.

When bezel portion 120 is combined with metal bracket 210 that has been connected to bezel portion 110, protrusion 218 formed on linear portion 212 of metal bracket 210 fits into third through-hole 126 from a front side (i.e., from the positive side in the Z-axis direction) of second portion 121b. In the present exemplary embodiment, protrusion 218 of linear portion 212 and third through-hole 126 are formed in such a manner that when protrusion 218 fits into third through-hole 126, second through-holes 125 and fixing holes 217 of metal bracket 210 coincide with each other in the front-rear direction (i.e., in the Z-axis direction), and first through-hole 124 and fixing hole 213 of metal bracket 210 coincide with each other in the front-rear direction (i.e., in the Z-axis direction). Therefore, when bezel portion 120 is connected to metal bracket 210 connected to bezel portion 110, bezel portion 120 is easily placed in the predetermined position on metal bracket 210 connected to bezel portion 110 (i.e., the position where the through-holes and the respective corresponding fixing holes coincide with each other in the front-rear direction (i.e., in the Z-axis direction)) just by fitting protrusion 218 into third through-hole 126.

Bezel portion 110 may have, at its part overlapping bezel portion 120, rib 117 formed to project toward the rear side (i.e., toward the negative side in the Z-axis direction) and extend in the longitudinal direction (i.e., in the X-axis direction) of bezel portion 110. Bezel portion 120 may have, at its part facing rib 117 of bezel portion 110, groove 127 formed into a shape which is recessed into the rear side (i.e., in the direction toward the negative side of the Z-axis), and into which rib 117 fits. Bezel portion 110 and bezel portion 120 formed in this way are easily disposed to overlap each other in the predetermined position (i.e., the position where the through-holes and the respective corresponding fixing holes coincide with each other in the front-rear direction (i.e., in the Z-axis direction)) by making bezel portion 110 and bezel portion 120 overlap each other in such a manner that rib 117 fits into groove 127.

Bezel portion 110 and bezel portion 120 are combined with, and fixed to, base plate 20 as described above, thereby forming the structure illustrated in FIG. 10.

Next, a relationship among bezel portion 110 and bezel portion 120, joining member 200, and base plate 20 in the state in which bezel portion 110 and bezel portion 120 are combined with base plate 20 is described with reference to the cross-sectional views in FIGS. 11 and 12.

Figure 11:
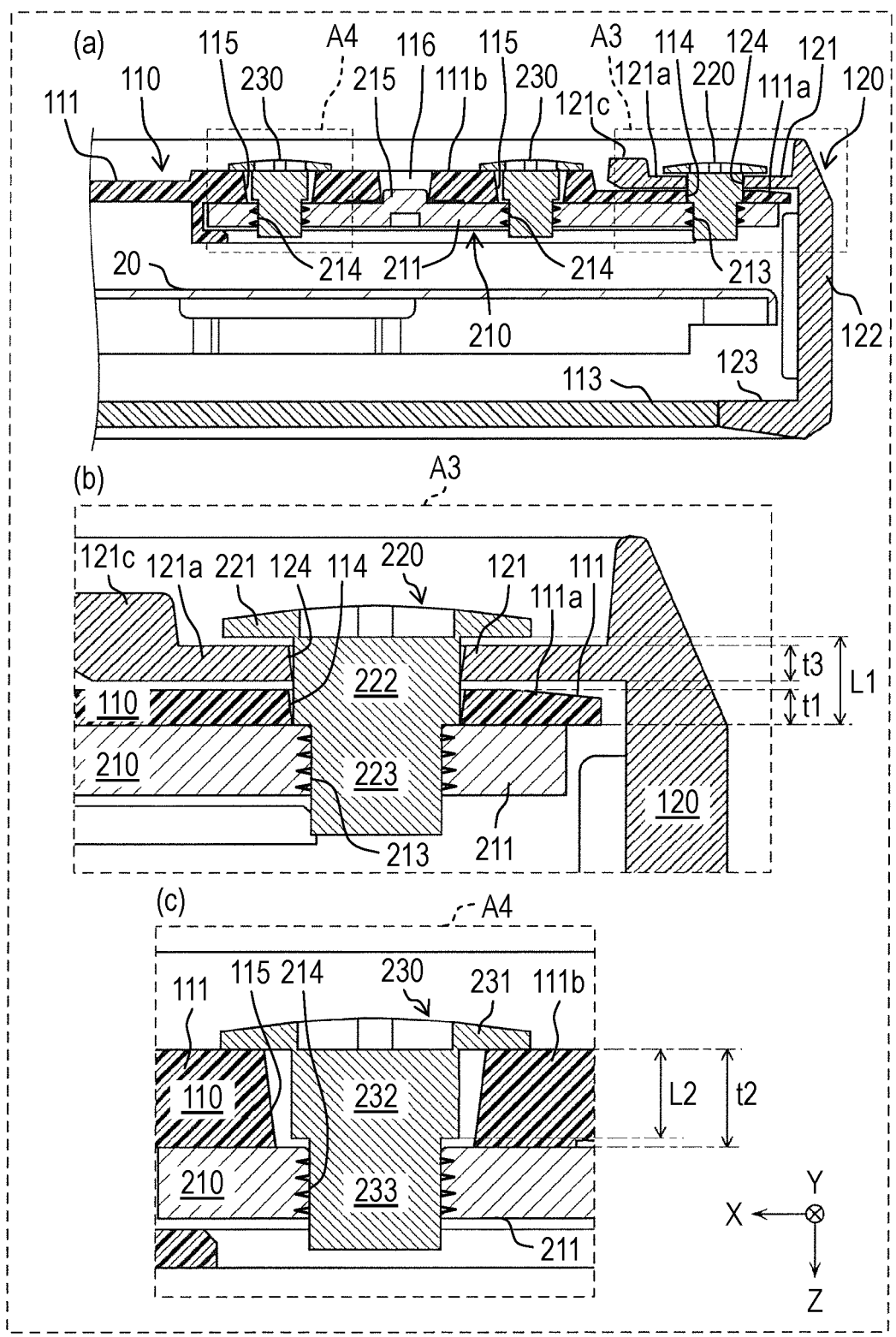
FIG. 11 illustrates partial cross-sectional views of the display device in the first exemplary embodiment.

FIG. 11 illustrates partial cross-sectional views of display device 1 in the first exemplary embodiment. The cross-sectional views illustrated in FIG. 11 are taken along line XI-XI in FIG. 5. Part (a) of FIG. 11 is the cross-sectional view, taken along line XI-XI in FIG. 5, illustrating bezel portion 110 and bezel portion 120 that have been combined with base plate 20. Part (b) of FIG. 11 is an enlarged view of region A3 indicated by a dashed line in part (a) of FIG. 11. Part (c) of FIG. 11 is an enlarged view of region A4 indicated by a dashed line in part (a) of FIG. 11.

Figure 12:
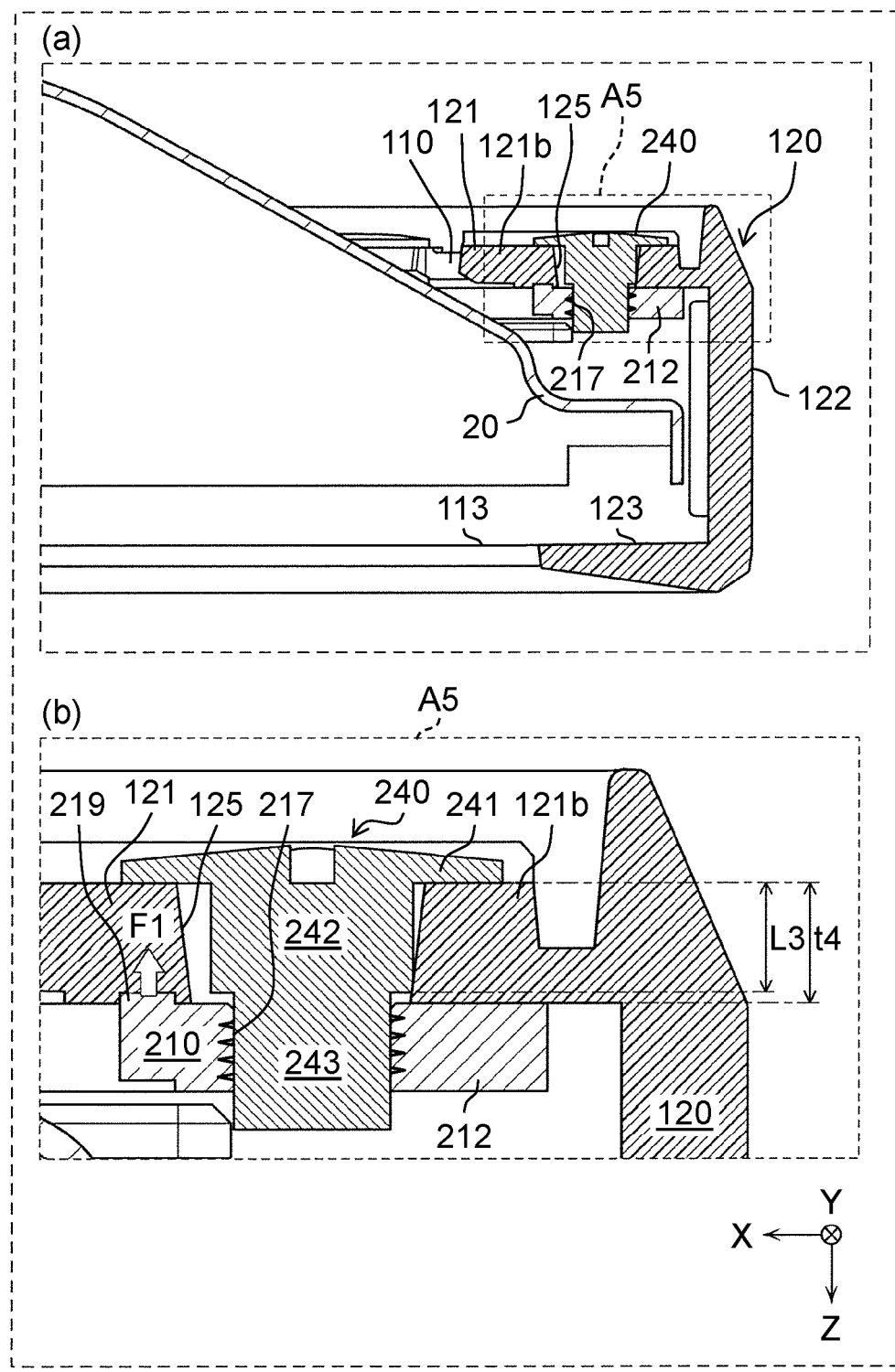
FIG. 12 illustrates partial cross-sectional views of the display device in the first exemplary embodiment.

FIG. 12 illustrates partial cross-sectional views of display device 1 in the first exemplary embodiment. The cross-sectional views illustrated in FIG. 12 are taken along line XII-XII in FIG. 5. Part (a) of FIG. 12 is the cross-sectional view, taken along line XII-XII in FIG. 5, illustrating bezel portion 110 and bezel portion 120 that have been combined with base plate 20. Part (b) of FIG. 12 is an enlarged view of region A5 indicated by a dashed line in part (a) of FIG. 12.

As illustrated in FIG. 8, bezel portion 110 disposed on the upper side (i.e., the longer side on the positive side in the Y-axis direction) of base plate 20 has, in rear portion 111, first portion 111a where first through-hole 114 is formed, and second portion 111b where the plurality of (for example, two) second through-holes 115 and third through-hole 116 are formed. As illustrated in FIG. 11, thickness t1 (see part (b) of FIG. 11) of first portion 111a in the front-rear direction (i.e., in the Z-axis direction) is less than thickness t2 (see part (c) of FIG. 11) of second portion 111b in the front-rear direction (i.e., in the Z-axis direction).

Also, as illustrated in FIG. 9, bezel portion 120 disposed on the one shorter side (i.e., the shorter side on the negative side in the X-axis direction) of base plate 20 has, in rear portion 121, first portion 121a where first through-hole 124 is formed, and second portion 121b where the plurality of (for example, two) second through-holes 125 and third through-hole 126 are formed. As illustrated in FIGS. 11 and 12, thickness t3 (see part (b) of FIG. 11) of first portion 121a in the front-rear direction (i.e., in the Z-axis direction) is less than thickness t4 (see part (b) of FIG. 12) of second portion 121b in the front-rear direction (i.e., in the Z-axis direction). Also, in rear portion 121 of bezel portion 120, thick portion 121c having a thickness (i.e., a size in the Z-axis direction) greater than thickness t3 of first portion 121a is formed inwardly of (i.e., on the positive side in the X-axis direction) and below (i.e., on the negative side in the Y-axis direction) first portion 121a.

As illustrated in FIGS. 11 and 12, connecting member 220, connecting members 230, and connecting members 240 are stepped screws. Specifically, as illustrated in part (b) of FIG. 11, connecting member 220 has external thread 223, which screws into fixing hole 213 of metal bracket 210 at a tip, shank 222, which is larger in diameter than external thread 223, and head 221, which is larger in diameter than shank 222. As illustrated in part (c) of FIG. 11, connecting members 230 each have external thread 233, which screws into fixing hole 214 of metal bracket 210 at a tip, shank 232, which is larger in diameter than external thread 233, and head 231, which is larger in diameter than shank 232. As illustrated in part (b) of FIG. 12, connecting members 240 each have external thread 243, which screws into fixing hole 217 of metal bracket 210 at a tip, shank 242, which is larger in diameter than external thread 243, and head 241, which is larger in diameter than shank 242. Hence, in connecting member 220, shank 222 passes through first through-hole 124 of rear portion 121 of bezel portion 120 and first through-hole 114 of rear portion 111 of bezel portion 110, and external thread 223 is fixed into fixing hole 213 of metal bracket 210. In each connecting member 230, shank 232 passes through second through-hole 115 of rear portion 111 of bezel portion 110, and external thread 233 is fixed into fixing hole 214 of metal bracket 210. In each connecting member 240, shank 242 passes through second through-hole 125 of rear portion 121 of bezel portion 120, and external thread 243 is fixed into fixing hole 217 of metal bracket 210.

Also, length L1, in an axial direction (i.e., in the Z-axis direction), of shank 222 of connecting member 220 passing through first through-hole 114 of first portion 111a of bezel portion 110 and first through-hole 124 of first portion 121a of bezel portion 120 is set to be greater than the sum of thickness t1 of first portion 111a of bezel portion 110 and thickness t3 of first portion 121a of bezel portion 120 as illustrated in part (b) of FIG. 11. Specifically, the sum of thickness t1 of first portion 111a of bezel portion 110 and thickness t3 of first portion 121a of bezel portion 120 is less than length L1 of shank 222 of connecting member 220.

Also, length L2, in an axial direction (i.e., in the Z-axis direction), of shank 232 of each connecting member 230 passing through second through-hole 115 in second portion 111b of bezel portion 110 is set to be less than thickness t2 of second portion 111b of bezel portion 110 as illustrated in part (c) of FIG. 11. Specifically, thickness t2 of second portion 111b of bezel portion 110 is equal to or larger than length L2 of shank 232 of each connecting member 230.

Also, length L3, in an axial direction (i.e., in the Z-axis direction), of shank 242 of each connecting member 240 passing through second through-hole 125 in second portion 121b of bezel portion 120 is set to be less than thickness t4 of second portion 121b of bezel portion 120 as illustrated in part (b) of FIG. 12. Specifically, thickness t4 of second portion 121b of bezel portion 120 is equal to or larger than length L3 of shank 242 of each connecting member 240.

Accordingly, as illustrated in part (b) of FIG. 11, connecting member 220 connects first portion 111a of bezel portion 110, first portion 121a of bezel portion 120, and metal bracket 210, with shank 222 passing through first through-hole 114 of first portion 111a and first through-hole 124 of first portion 121a, and with gaps existing in the front-rear direction (i.e., in the Z-axis direction) of base plate 20 between a lower surface (i.e., a surface on the positive side in the Z-axis direction) of head 221 and an upper surface (i.e., a surface on the negative side in the Z-axis direction) of metal bracket 210.

Also, as illustrated in part (c) of FIG. 11, connecting members 230 each connect second portion 111b of bezel portion 110 and metal bracket 210, with shank 232 passing through second through-hole 115 of second portion 111b, and with no gap existing in the front-rear direction (i.e., in the Z-axis direction) of base plate 20 between a lower surface (i.e., a surface on the positive side in the Z-axis direction) of head 231 and the upper surface (i.e., the surface on the negative side in the Z-axis direction) of metal bracket 210. Specifically, connecting members 230 each connect second portion 111b of bezel portion 110 and metal bracket 210, with a gap existing in the front-rear direction (i.e., in the Z-axis direction) of base plate 20 between a lower surface (i.e., a surface on the positive side in the Z-axis direction) of shank 232 and the upper surface (i.e., the surface on the negative side in the Z-axis direction) of metal bracket 210.

Also, as illustrated in part (b) of FIG. 12, connecting members 240 each connect second portion 121b of bezel portion 120 and metal bracket 210, with shank 242 passing through second through-hole 125 of second portion 121b, and with no gap existing in the front-rear direction (i.e., in the Z-axis direction) of base plate 20 between a lower surface (i.e., a surface on the positive side in the Z-axis direction) of head 241 and the upper surface (i.e., the surface on the negative side in the Z-axis direction) of metal bracket 210. Specifically, connecting members 240 each connect second portion 121b of bezel portion 120 and metal bracket 210, with a gap existing in the front-rear direction (i.e., in the Z-axis direction) of base plate 20 between a lower surface (i.e., a surface on the positive side in the Z-axis direction) of shank 242 and the upper surface (i.e., the surface on the negative side in the Z-axis direction) of metal bracket 210.

Also, as illustrated in parts (b) and (c) of FIG. 11, a gap between second through-hole 115 and shank 232 of connecting member 230 (i.e., a gap in a radial direction of second through-hole 115) is larger than a gap between first through-hole 114 and shank 222 of connecting member 220 (i.e., a gap in a radial direction of first through-hole 114), and is larger than a gap between first through-hole 124 and shank 222 of connecting member 220 (i.e., a gap in a radial direction of first through-hole 124).

Also, as illustrated in part (b) of FIG. 11 and part (b) of FIG. 12, a gap between second through-hole 125 and shank 242 of connecting member 240 (i.e., a gap in a radial direction of second through-hole 125) is larger than the gap between first through-hole 114 and shank 222 of connecting member 220 (i.e., the gap in the radial direction of first through-hole 114), and is larger than the gap between first through-hole 124 and shank 222 of connecting member 220 (i.e., the gap in the radial direction of first through-hole 124).

Also, as illustrated in part (a) of FIG. 11 and part (a) of FIG. 12, metal bracket 210 and connecting members 220 to 240 that form each joining member 200 are disposed in positions where metal bracket 210 and connecting members 220 to 240 overlap base plate 20 in the front-rear direction (i.e., in the Z-axis direction) on a back side (i.e., a surface on the negative side in the Z-axis direction) of base plate 20 of display module 10.

Although description of bezel portion 140 and bezel portion 130 is omitted in the foregoing exemplary embodiment, bezel portion 140 has substantially the same structure as bezel portion 120 except that bezel portion 140 is symmetrical to bezel portion 120 with respect to a vertical line. Thus, bezel portion 120 may be read as bezel portion 140 in the foregoing description. Similarly, bezel portion 130 has substantially the same structure as bezel portion 110 except that bezel portion 130 is symmetrical to bezel portion 110 with respect to a horizontal line, and that a number of connecting members 283 and a direction in which connecting members 283 are connected are different from the corresponding number and connection direction in bezel portion 110. Hence, bezel portion 110 may be read as bezel portion 130 in the foregoing description.

Although description of joining members 250 is omitted in the foregoing exemplary embodiment, members that are substantially the same as connecting members 220 to 240 included in joining members 200 may be employed as connecting members 270 included in joining members 250. Also, FIG. 4 illustrates the structure in which joining members 250 each include metal bracket 260 having a different shape than metal brackets 210 of joining members 200. However, the illustrated shapes of metal brackets 210 and metal brackets 260 are merely example shapes of the metal brackets. Metal brackets 260 illustrated in FIG. 4 have a shape of metal brackets 210 in which some of the fixing holes and protrusions are omitted, but may be used for substantially the same purpose as metal brackets 210. Joining members 250 are members that have substantially the same function as joining members 200 in that the lower end (i.e., the end on the negative side in the Y-axis direction) of bezel portion 120 and the one end (i.e., the end on the negative side in the X-axis direction) of bezel portion 130 are joined together by metal bracket 260 and connecting members 270, and the lower end (i.e., the end on the negative side in the Y-axis direction) of bezel portion 140 and the other end (i.e., the end on the positive side in the X-axis direction) of bezel portion 130 are joined together by metal bracket 260 and connecting members 270. As metal brackets 260, metal brackets having substantially the same shape as metal brackets 210 may also be used.

[1-2. Effects, etc.]

As set forth above, a display device in the present exemplary embodiment includes a display module including a display panel that displays an image in a display area provided at a front, and a bezel surrounding an outer edge of the display module. The display area has a rectangular shape. The bezel includes a plurality of bezel portions having an elongated shape and disposed to correspond to respective four sides of the display area, and a joining member joining together two adjacent bezel portions of the plurality of bezel portions. The joining member is disposed in a position where the joining member overlaps the display module on a back side of the display module.

Display device 1 is an example of the display device. Display area 101 is an example of the display area. Display panel 60 is an example of the display panel. Display module 10 is an example of the display module. Bezel 100 is an example of the bezel. Bezel portions 110 to 140 are examples of the plurality of bezel portions. Joining members 200 and joining members 250 are examples of the joining member.

For example, display device 1 described in the first exemplary embodiment includes display module 10 including display panel 60 that displays an image in display area 101 provided at a front, and bezel 100 surrounding an outer edge of display module 10. Display area 101 has a rectangular shape. Bezel 100 includes bezel portions 110 to 140 having an elongated shape and disposed to correspond to respective four sides of display area 101, and joining members 200 and joining members 250 each configured to join together two adjacent bezel portions (for example, bezel portion 110 and bezel portion 120) of bezel portions 110 to 140. Joining members 200 and joining members 250 are disposed in respective positions where joining members 200 and joining members 250 overlap display module 10 in a front-rear direction (i.e., in the Z-axis direction) on a back side (i.e., a surface on the negative side in the Z-axis direction) of display module 10.

In display device 1 having this structure, joining members 200 and joining members 250 are disposed in the positions where joining members 200 and joining members 250 overlap display module 10 in the front-rear direction (i.e., in the Z-axis direction) on the back side (i.e., the rear side) of display module 10, which is opposite the side (i.e., the side of display area 101) on which an image is displayed. This allows the width of bezel 100 to be reduced sufficiently when display device 1 is viewed from the image-display surface side (i.e., viewed from the front). Accordingly, the ratio of the size of display area 101 to the size of display device 1 is increased sufficiently when display device 1 is viewed from the image-display surface side (i.e., viewed from the front). That is, the size of display device 1 viewed from the front is easily reduced, while maintaining the size of display area 101 in display device 1.

In the display device, each of the plurality of bezel portions may have a plurality of through-holes at an end of the bezel portion in a longitudinal direction of the bezel portion. The plurality of through-holes may be arranged in the longitudinal direction. The joining member may include a metal bracket having a plate shape, and connecting members. Each of the connecting members may connect the metal bracket and the two adjacent bezel portions of the plurality of bezel portions, with the metal bracket and a part of each of the two adjacent bezel portions being disposed to overlap each other in a front-rear direction of the display module. The connecting members may include a first connecting member used in common for the two adjacent bezel portions, and second connecting members used for each of the two adjacent bezel portions. The first connecting member may connect the metal bracket and a first portion, in which a first through-hole is formed, of ehch of the two adjacent bezel portions, with the first connecting member passing through each of the first through-holes, and with a gap existing between the metal bracket and each of the first portions in the front-rear direction. The first through-hole may be one of the plurality of through-holes of the bezel portion and may be disposed at an outermost end in the longitudinal direction of the bezel portion. The second connecting member may connect the metal bracket and a second portion, in which a second through-hole is formed, of a corresponding one of the two adjacent bezel portions, with the second connecting member passing through the second through-hole, and with no gap existing between the metal bracket and the second portion in the front-rear direction. The second through-hole may be one of the plurality of through-holes of the bezel portion and may be different from the first through-hole.

First through-holes 114, 124 and second through-holes 115, 125 are examples of the through-holes. Metal brackets 210, 260 are examples of the metal bracket. Connecting members 220, 230, 240, 270 are examples of the connecting members. Each of first through-holes 114, 124 is an example of the first through-hole. Each of first portions 111a, 121a is an example of the first portion. Connecting member 220 is an example of the first connecting member. Second through-holes 115, 125 are examples of the second through-holes. Second portions 111b, 121b are examples of the second portions. Connecting members 230, 240 are examples of the second connecting members.

For example, in display device 1 described in the first exemplary embodiment, bezel portion 110 has a plurality of through-holes at an end of bezel portion 110 in a longitudinal direction of bezel portion 110. The plurality of through-holes are arranged in the longitudinal direction of bezel portion 110. Bezel portion 120 (140) has a plurality of through-holes at an end of bezel portion 120 (140) in a longitudinal direction of bezel portion 120 (140). The plurality of through-holes are arranged in the longitudinal direction of bezel portion 120 (140). Joining members 200 each include metal bracket 210 having a plate shape, and connecting members 220 to 240. Connecting members 220 to 240 are configured to connect metal bracket 210 and two adjacent bezel portions (for example, bezel portion 110 and bezel portion 120) of bezel portions 110 to 140, with metal bracket 210 and a part of each of the two adjacent bezel portions being disposed to overlap each other in a front-rear direction (i.e., in the Z-axis direction) of display module 10. Of connecting members 220 to 240, connecting member 220, which serves as a first connecting member, is used in common for the two adjacent bezel portions (for example, bezel portion 110 and bezel portion 120), and connects metal bracket 210, first portion 111a, in which first through-hole 114 is formed, of one bezel portion (for example, bezel portion 110) of the two adjacent bezel portions, and first portion 121a, in which first through-hole 124 is formed, of the other bezel portion (for example, bezel portion 120) with connecting member 220 passing through first through-hole 114 and first through-hole 124, and with a gap existing between metal bracket 210 and each of first portions 111a and 121a in the front-rear direction (i.e., in the Z-axis direction). First through-hole 114 is one of the plurality of through-holes of bezel portion 110 and is disposed at an outermost end (i.e., an end on the negative side in the X-axis direction) in the longitudinal direction of bezel portion 110. First through-hole 124 is one of the plurality of through-holes of bezel portion 120 and is disposed at an outermost end (i.e., an end on the positive side in the Y-axis direction) in the longitudinal direction of bezel portion 120. Of connecting members 220 to 240, connecting members 230 and connecting members 240, which serve as second connecting members, are used for each of the two adjacent bezel portions (for example, bezel portion 110 and bezel portion 120). Connecting members 230 each connect metal bracket 210 and second portion 111b, in which second through-holes 115 are formed, of one bezel portion (for example, bezel portion 110) of the two adjacent bezel portions, with connecting members 230 passing through second through-holes 115 respectively, and with no gap existing between metal bracket 210 and second portion 111b in the front-rear direction (i.e., in the Z-axis direction). Second through-holes 115 are two of the plurality of through-holes of bezel portion 110, and are different from first through-hole 114. Connecting members 240 each connect metal bracket 210 and second portion 121b, in which second through-holes 125 are formed, of the other bezel portion (for example, bezel portion 120) of the two adjacent bezel portions, with connecting members 240 passing through second through-holes 125 respectively, and with no gap existing between metal bracket 210 and second portion 121b in the front-rear direction (i.e., in the Z-axis direction). Second through-holes 125 are two of the plurality of through-holes of bezel portion 120, and are different from first through-hole 124.

In display device 1 having this structure, for example, adjacent bezel portion 110 and bezel portion 120 are connected to metal bracket 210 with a gap existing, in first portion 111a where first through-hole 114 disposed at an outermost end (i.e., the end on the negative side in the X-axis direction) of bezel portion 110 is formed, and in first portion 121a where first through-hole 124 disposed at an outermost end (i.e., the end on the positive side in the Y-axis direction) of bezel portion 120 is formed. Also, bezel portion 110 is connected to metal bracket 210 with no gap existing, in second portion 111b where second through-holes 115 different from first through-hole 114 are formed. Also, bezel portion 120 is connected to metal bracket 210 with no gap existing, in second portion 121b where second through-holes 125 different from first through-hole 124 are formed. As describe above, in display device 1, the two adjacent bezel portions (for example, bezel portion 110 and bezel portion 120) are joined together, with their respective outermost ends not being fixed to each other (that is, with a gap existing). Thus, even if thermal expansion or thermal contraction of bezel portions 110 to 140 occurs due to temperature changes and causes deformation of the corner of bezel 100 where the two adjacent bezel portions (for example, bezel portion 110 and bezel portion 120) are connected, such deformation is allowable. Therefore, in display device 1, even if thermal expansion or thermal contraction of bezel portions 110 to 140 occurs due to temperature changes, damage to bezel 100 caused by such temperature changes can be suppressed.

In the display device, the first portion of one bezel portion of the two adjacent bezel portions and the first portion of the other bezel portion of the two adjacent bezel portions may be connected to the metal bracket by the first connecting member, with the first portion of the one bezel portion and the first portion of the other bezel portion overlapping each other. The first connecting member may connect the first portion of the one bezel portion, the first portion of the other bezel portion, and the metal bracket with a gap existing in the front-rear direction.

For example, in display device 1 described in the first exemplary embodiment, the first portion (for example, first portion 111a) of one bezel portion (for example, bezel portion 110) of the two adjacent bezel portions (for example, bezel portion 110 and bezel portion 120) and the first portion (for example, first portion 121a) of the other bezel portion (for example, bezel portion 120) of the two adjacent bezel portions are connected to metal bracket 210 by connecting member 220 serving as the first connecting member, with first portions 111a and 121a overlapping each other. Connecting member 220 serving as the first connecting member connects the first portion (for example, first portion 111a) of the one bezel portion (for example, bezel portion 110), the first portion (for example, first portion 121a) of the other bezel portion (for example, bezel portion 120), and metal bracket 210 with a gap existing in the front-rear direction (i.e., in the Z-axis direction).

In display device 1 having this structure, connecting member 220 connects together the two adjacent bezel portions (for example, bezel portion 110 and bezel portion 120) and metal bracket 210, with the first portions (for example, first portion 111a and first portion 121a) of the two bezel portions (for example, bezel portion 110 and bezel portion 120) being disposed to overlap each other, and with a gap existing between the two bezel portions (for example, bezel portion 110 and bezel portion 120) and metal bracket 210. Accordingly, in display device 1, when deformation of a corner of bezel 100 occurs due to temperature changes, it is possible, in that corner, to reduce displacements of the connection point of the two adjacent and connected bezel portions (for example, bezel portion 110 and bezel portion 120) while the deformation is allowable.

In the display device, the first connecting member and the second connecting members may be stepped screws. The first connecting member and the second connecting members may each have an external thread configured to screw into the metal bracket at a tip, a shank being larger in diameter than the external thread, and a head being larger in diameter than the shank. A sum of thicknesses of the first portions of the two adjacent bezel portions may be less than a length, in an axial direction, of the shank of the first connecting member. A thickness of the second portion of each of the two adjacent bezel portions may be equal to or larger than a length, in an axial direction, of the shank of each of the second connecting members.

External threads 223, 233, 243 are examples of the external thread. Shanks 222, 232, 242 are examples of the shank. Heads 221, 231, 241 are examples of the head. Thickness t1 of first portion 111a and thickness t3 of first portion 121a are examples of the thicknesses of the first portions. Length L1 of the shank of connecting member 220 is an example of the length of the shank of the first connecting member. Thickness t2 of second portion 111b and thickness t4 of second portion 121b are examples of the thicknesses of the second portions. Length L2 of shank 232 of connecting members 230 and length L3 of shank 242 of connecting members 240 are examples of the length of the shank of the second connecting members.

For example, in display device 1 described in the first exemplary embodiment, connecting member 220 serving as the first connecting member, and connecting members 230, 240 serving as the second connecting members are stepped screws. Connecting member 220 serving as the first connecting member has external thread 223 configured to screw into metal bracket 210 at a tip, shank 222 being larger in diameter than external thread 223, and head 221 being larger in diameter than shank 222. Connecting members 230 serving as the second connecting members each have external thread 233 configured to screw into metal bracket 210 at a tip, shank 232 being larger in diameter than external thread 233, and head 231 being larger in diameter than shank 232. Also, connecting members 240 serving as the second connecting members each have external thread 243 configured to screw into metal bracket 210 at a tip, shank 242 being larger in diameter than external thread 243, and head 241 being larger in diameter than shank 242. A sum (t1+t3) of thickness t1 of first portion 111a of one (for example, bezel portion 110) of the two adjacent bezel portions (for example, bezel portion 110 and bezel portion 120) and thickness t3 of first portion 121a of the other bezel portion (for example, bezel portion 120) is less than length L1, in an axial direction, of shank 222 of connecting member 220 serving as the first connecting member. Thickness t2 of second portion 111b of one (for example, bezel portion 110) of the two adjacent bezel portions (for example, bezel portion 110 and bezel portion 120) is equal to or larger than length L2, in an axial direction, of shank 232 of each connecting member 230 serving as the second connecting member. Thickness t4 of second portion 121b of the other bezel portion (for example, bezel portion 120) is equal to or larger than length L3, in an axial direction, of shank 242 of each connecting member 240 serving as the second connecting member.

In display device 1 having this structure, connecting member 220, which is a stepped screw, easily connects first portion 111a of one (for example, bezel portion 110) of the two adjacent bezel portions (for example, bezel portion 110 and bezel portion 120), first portion 121a of the other bezel portion (for example, bezel portion 120), and metal bracket 210, with a gap existing in the front-rear direction (i.e., in the Z-axis direction), in first portion 111a and in first portion 121a. Also, connecting members 230, 240, which are stepped screws, easily fix second portion 111b of one (for example, bezel portion 110) of the two adjacent bezel portions (for example, bezel portion 110 and bezel portion 120) and metal bracket 210 to each other in second portion 111b with predetermined pressing force (for example, pressing force produced by a difference between length L2 and thickness t2 and by clamping force of connecting members 230 serving as the second connecting members) being applied, and fix second portion 121b of the other bezel portion (for example, bezel portion 120) and metal bracket 210 to each other in second portion 121b with a predetermined pressing force (for example, pressing force produced by a difference between length L3 and thickness t4 and by clamping force of connecting members 240 serving as the second connecting members) being applied.

In the display device, a gap between each of the second through-holes and a corresponding one of the second connecting members in a radial direction of the second through-hole may be larger than a gap between each of the first through-holes and the first connecting member in a radial direction of the first through-hole.

For example, in display device 1 described in the first exemplary embodiment, a gap between each of second through-holes 115 and a corresponding one of connecting members 230, serving as the second connecting members, in the radial direction of second through-hole 115 is larger than a gap between first through-hole 114 and connecting member 220, serving as the first connecting member, in the radial direction of first through-hole 114, and is larger than a gap between first through-hole 124 and connecting member 220 in the radial direction of first through-hole 124. Also, a gap between each of second through-holes 125 and a corresponding one of connecting members 240, serving as the second connecting members, in the radial direction of second through-hole 125 is larger than the gap between first through-hole 114 and connecting member 220, serving as the first connecting member, in the radial direction of first through-hole 114, and is larger than the gap between first through-hole 124 and connecting member 220 in the radial direction of first through-hole 124.

In display device 1 having this structure, second portion 111b is allowed to move in the radial direction of second through-holes 115 (i.e., move in the X-Y plane), and second portion 121b is allowed to move in the radial direction of second through-holes 125 (i.e., move in the X-Y plane). Also, first portion 111a is allowed to move in a circumferential direction of first through-hole 114 (i.e., move in the Z-axis direction), and first portion 121a is allowed to move in a circumferential direction of first through-hole 124 (i.e., move in the Z-axis direction). Accordingly, in display device 1, even if thermal expansion or thermal contraction of bezel portions 110 to 140 occurs due to temperature changes, it is possible, in each corner of bezel 100, to reduce displacements of the connection point of the two adjacent and connected bezel portions (for example, bezel portion 110 and bezel portion 120) while the deformation of the corner due to such temperature changes is allowable.

In the display device, the metal bracket may have a plurality of fixing holes into which the connecting members are fixed respectively, and a projection disposed at a position from a position of a corresponding one of the plurality of fixing holes to a position inside the display area. The projection may project toward a corresponding one of the bezel portions. The corresponding one of the plurality of fixing holes may be a fixing hole into which one of the second connecting members is fixed.

Fixing holes 213, 214, 217 are examples of the plurality of fixing holes. Fixing holes 214, 217 are examples of the fixing holes into which the second connecting members are fixed. Projections 216, 219 are examples of the projections.

For example, in display device 1 described in the first exemplary embodiment, each metal bracket 210 has fixing hole 213 into which connecting member 220 is fixed, fixing holes 214 into which connecting members 230 are fixed respectively, and fixing holes 217 into which connecting members 240 are fixed respectively. Also, in metal brackets 210, connecting members 230 serving as the second connecting members are fixed into fixing holes 214 respectively, and connecting members 240 serving as the second connecting members are fixed into fixing holes 217 respectively. Further, each metal bracket 210 includes projections 216 disposed at positions from the respective positions of fixing holes 214 to respective positions inside display area 101 (for example, positions on the negative side in the Y-axis direction) and projecting toward a corresponding one of the bezel portions (for example, bezel portion 110) (i.e., projecting in the direction toward the negative side of the Z-axis), and projections 219 disposed at positions from the respective positions of fixing holes 217 to respective positions inside a display area 101 (for example, positions on the negative side in the X-axis direction) and projecting toward a corresponding one of the bezel portions (for example, bezel portion 120) (i.e., projecting in the direction toward the negative side of the Z-axis).

In display device 1 having this structure, for example, it is possible to connect bezel portion 110 and metal bracket 210 while pressing force F1 (i.e., force by which the end of bezel portion 110 on the negative side in the Y-axis direction is pressed toward the negative side in the Z-axis direction) is applied to the end of bezel portion 110 from projections 216, and connect bezel portion 120 and metal bracket 210 while pressing force F1 (i.e., force by which the end of bezel portion 120 on the positive side in the X-axis direction is pressed toward the negative side in the Z-axis direction (see FIG. 12)) is applied to the end of bezel portion 120 from projections 219. Specifically, in display device 1, the bezel portions (for example, bezel portions 110, 120) are fixed to metal bracket 210 with pressing force F1 in a twisting direction being applied to the bezel portions (for example, bezel portions 110, 120). Therefore, in display device 1, deflection of the bezel portions (for example, bezel portions 110, 120) can be suppressed, enabling the strength of the bezel portions (for example, bezel portions 110, 120) to be increased. It is desired that sizes of projections 216, 219 be set as appropriate with consideration given, for example, to the specifications of bezel 100 including the strength required in bezel 100.

In the display device, one bezel portion of the two adjacent bezel portions may have, in a part overlapping the other bezel portion of the two adjacent bezel portions, a rib projecting rearwardly and extending in a longitudinal direction of the one bezel portion. The other bezel portion may have, in a part facing the rib of the one bezel portion, a groove recessed rearwardly and having a shape into which the rib fits.

Rib 117 is an example of the rib. Groove 127 is an example of the groove.

For example, in display device 1 described in the first exemplary embodiment, one bezel portion (for example, bezel portion 110) of the two adjacent bezel portions (for example, bezel portion 110 and bezel portion 120) has, in a part overlapping the other bezel portion (for example, bezel portion 120) of the two adjacent bezel portions, rib 117 projecting rearwardly (i.e., toward the negative side in the Z-axis direction) and extending in a longitudinal direction of the one bezel portion (for example, bezel portion 110). Also, the other bezel portion (for example, bezel portion 120) has, in a part facing rib 117 of the one bezel portion (for example, bezel portion 110), groove 127 recessed rearwardly (i.e., toward the negative side in the Z-axis direction) and having a shape into which rib 117 fits.

In display device 1 having this structure, the two adjacent bezel portions (for example, bezel portion 110 and bezel portion 120) are easily disposed to overlap each other in a predetermined position (i.e., a position where the through-holes and the respective corresponding fixing holes coincide with each other in the front-rear direction (i.e., in the Z-axis direction)).

The display device may further include a support substrate disposed rearwardly of the display panel and configured to support the display panel. The bezel may be fixed to the support substrate at a position away from a position where the joining member is disposed.

Base plate 20 is an example of the support substrate.

For example, display device 1 described in the first exemplary embodiment further includes base plate 20, as a support substrate, disposed rearwardly of display panel 60 and configured to support display panel 60. Bezel 100 is fixed to base plate 20 by connecting members 281 to 284 at positions away from positions where joining members 200 and joining members 250 are disposed.

In display device 1 having this structure, bezel 100 is not fixed to base plate 20 in the positions where joining members 200 and joining members 250 are disposed. Thus, even if thermal expansion or thermal contraction of bezel portions 110 to 140 occurs due to temperature changes and causes deformation of the corner of bezel 100 where the two adjacent bezel portions (for example, bezel portion 110 and bezel portion 120) are joined, the deformation is allowable. Therefore, in display device 1, even if thermal expansion or thermal contraction of bezel portions 110 to 140 occurs due to temperature changes, damage to bezel 100 caused by such temperature changes can be suppressed.

In the foregoing exemplary embodiment, bezel portion 110 and bezel portion 120 have been described as the examples of the two adjacent bezel portions of bezel portions 110 to 140. However, effects similar to those described above are also achievable for other two adjacent bezel portions (for example, bezel portion 120 and bezel portion 130; bezel portion 130 and bezel portion 140; and bezel portion 110 and bezel portion 140) by making these bezel portions have substantially the same structure as the structure described in the exemplary embodiment.

Other Exemplary Embodiments

The first exemplary embodiment has been described above as an example of the technique disclosed in the present application. However, the technique in the present disclosure is not limited to the first exemplary embodiment, and is also applicable to exemplary embodiments having undergone alterations, substitutions, additions, omissions, or the like. In addition, new exemplary embodiments can be made by combining constituent elements described in the foregoing first exemplary embodiment.

Other exemplary embodiments are thus described below.

In the exemplary embodiment, the example structure, in which display device 1 is a liquid crystal display device that includes a liquid crystal display panel as display panel 60, is described. Display device 1, however, is not limited to any liquid crystal display device, and may be a display device including an organic electro luminescence (EL) panel or other display panel. Also, display device 1 may be a television receiver, a monitor device, a computer display device, or other device.

In the exemplary embodiment, the example structure, in which base plate 20 is formed of a plate-shaped metal, is described. The material of base plate 20, however, is not limited to any metal, but base plate 20 may be formed of other material having sufficient strength and durability.

In the exemplary embodiment, the example structure, in which light source substrates 30 include light-emitting diodes as the light sources, is described. The light sources, however, may be formed of light emitting elements (for example, EL elements) other than the light-emitting diodes. Also, the light sources need not be point light sources.

In the exemplary embodiment, the example structure, in which the plurality of light source substrates 30 are disposed on the front side (i.e., the surface on the positive side in the Z-axis direction) of base plate 20, is described. Display device 1, however, may include a single light source substrate in place of the plurality of light source substrates 30.

In the exemplary embodiment, the example structure, in which reflective sheet 40 is formed of white synthetic resin, is described. The material of reflective sheet 40, however, is not limited to any synthetic resin. Reflective sheet 40 may be formed of material that is capable of sufficiently reflecting light emitted from the light sources.

In the exemplary embodiment, the example structure, in which bezel 100 is formed of synthetic resin, is described. The material of bezel 100, however, is not limited to synthetic resin. Bezel 100 may be formed of a material having sufficient strength and durability to support display module 10, and may be formed of, for example, metal or other material.

In the exemplary embodiment, the example structure, in which joining members 250 disposed at the lower part (i.e., the end on the negative side in the Y-axis direction) of display device 1 are formed to have a different shape than joining members 200 disposed at the upper part (i.e., the end on the positive side in the Y-axis direction) of display device 1, is described. Joining members 250, however, may be formed to have substantially the same shape as joining members 200.

In the exemplary embodiment, the example structure, in which bezel 100 includes four bezel portions 110 to 140, is described. However, the number of bezel portions included in bezel 100 is not limited to four. Bezel 100 may include any other number of bezel portions instead of four.

In the exemplary embodiment, the example structure, in which connecting members 281 to 284 are formed of metal, is described. The material of connecting members 281 to 284, however, is not limited to metal. Connecting members 281 to 284 may be formed of any material having strength and durability required to fix bezel 100 to base plate 20. The number of connecting members 281 to 284, and the number of points in bezel portions 110 to 140 at which bezel portions 110 to 140 are fixed to base plate 20, which are described in the exemplary embodiment, are also merely examples. These numbers may be set as appropriate according to the size of display device 1 and the connection strength required for bezel portions 110 to 140, for example.

In the exemplary embodiment, the example structure, in which connecting members 220, 230, 240, 270 are formed of metal, is described. The material of connecting members 220, 230, 240, 270, however, is not limited to metal. Connecting members 220, 230, 240, 270 may be formed of any material having strength and durability required to connect adjacent bezel portions (for example, bezel portion 110 and bezel portion 120) together. Further, the number of connecting members 220, 230, 240, 270, the number of through-holes through which connecting members 220, 230, 240, 270 pass, and the number of fixing holes into which connecting members 220, 230, 240, 270 are fixed, which are described in the exemplary embodiment, are also merely examples. These numbers may be set as appropriate according to the connection strength required to connect two adjacent bezel portions, for example.

Optimum values of lengths L1 to L3 and thicknesses t1 to t4 described in the exemplary embodiment change depending on the material of bezel 100 and the specifications of bezel 100, for example. Hence, it is desired that these values be set as appropriate with consideration given, for example, to the material of bezel 100, and the specifications of bezel 100 including the strength required in bezel 100, for example.

The foregoing exemplary embodiments have been described as examples of the technique in the present disclosure. For this purpose, the accompanying drawings and the detailed description have been provided.

Therefore, to illustrate the above technique, the constituent elements illustrated and described in the accompanying drawings and the detailed description may include not only the constituent elements that are essential for solving the problem but also constituent elements that are not essential for solving the problem. These non-essential constituent elements therefore should not be instantly construed as being essential, based on the fact that the non-essential constituent elements are illustrated and described in the accompanying drawings and the detailed description.

Further, the foregoing exemplary embodiments are provided to exemplify the technique in the present disclosure, and thus various alterations, substitutions, additions, omissions, and the like can be made within the scope of the claims or equivalents of the claims.

INDUSTRIAL APPLICABILITY

The present disclosure may be applied, for example, to a display device that is easily reduced in size, while maintaining the size of a display area. Specifically, the present disclosure can be applied to a television receiver, an image recording and reproducing device, a monitor device, a computer display device, and other devices.

REFERENCE MARKS IN THE DRAWINGS

1: display device
1a: casing
10: display module
20: base plate
30: light source substrate
40: reflective sheet
50: optical sheet
60: display panel
71: connection terminal substrate
72: signal processing substrate
73: power supply substrate
100: bezel
101: display area
110, 120, 130, 140: bezel portion
111, 121: rear portion
111a, 121a: first portion
111b, 121b: second portion
112, 122: lateral portion
113, 123: front portion
114, 124: first through-hole
115, 125: second through-hole
116, 126: third through-hole
117: rib
127: groove
200, 250: joining member
210, 260: metal bracket
211, 212: linear portion
213, 214, 217: fixing hole
215, 218: protrusion
216, 219: projection
220, 230, 240, 270, 281, 282, 283, 284: connecting member
221, 231, 241: head 222, 232, 242: shank
223, 233, 243: external thread

The invention claimed is:
1. A display device comprising:
a display module including a display panel that displays an image in a display area provided at a front, the display area having a rectangular shape; and
a bezel surrounding an outer edge of the display module, wherein
the bezel includes:
  a plurality of bezel portions having an elongated shape and disposed to correspond to respective four sides of the display area; and
  a joining member joining together two adjacent bezel portions of the plurality of bezel portions,
the joining member is disposed in a position where the joining member overlaps the display module on a back side of the display module,
each bezel portion of the plurality of bezel portions has a plurality of through-holes at an end of the bezel portion in a longitudinal direction of the bezel portion, the plurality of through-holes being arranged in the longitudinal direction,
the joining member includes:
  a metal bracket having a plate shape; and
  connecting members each connecting the metal bracket and the two adjacent bezel portions of the plurality of bezel portions, with the metal bracket and a part of each of the two adjacent bezel portions being disposed to overlap each other in a front-rear direction of the display module, and
the connecting members includes:
  a first connecting member used in common for the two adjacent bezel portions and connecting the metal bracket and a first portion, in which a first through-hole is formed, of each of the two adjacent bezel portions, with the first connecting member passing through each of first through-holes, and with a gap existing between the metal bracket and each of first portions in the front-rear direction, the first through-hole being one of the plurality of through-holes of the bezel portion and being disposed at an outermost end in the longitudinal direction of the bezel portion.
2. The display device according to claim 1, wherein
one bezel portion of the two adjacent bezel portions has, in a part overlapping an other bezel portion of the two adjacent bezel portions, a rib projecting rearwardly and extending in a longitudinal direction of the one bezel portion, and
the other bezel portion has, in a part facing the rib of the one bezel portion, a groove recessed rearwardly and having a shape into which the rib fits.
3. The display device according to claim 1, further comprising a support substrate disposed rearwardly of the display panel and configured to support the display panel,
wherein the bezel is fixed to the support substrate at a position away from a position where the joining member is disposed.
4. A display device comprising:
a display module including a display panel that displays an image in a display area provided at a front, the display area having a rectangular shape; and
a bezel surrounding an outer edge of the display module, wherein
the bezel includes:
  a plurality of bezel portions having an elongated shape and disposed to correspond to respective four sides of the display area; and
  a joining member joining together two adjacent bezel portions of the plurality of bezel portions, and
the joining member is disposed in a position where the joining member overlaps the display module on a back side of the display module,
each bezel portion of the plurality of bezel portions has a plurality of through-holes at an end of the bezel portion in a longitudinal direction of the bezel portion, the plurality of through-holes being arranged in the longitudinal direction,
the joining member includes:
  a metal bracket having a plate shape; and
  connecting members each connecting the metal bracket and the two adjacent bezel portions of the plurality of bezel portions, with the metal bracket and a part of each of the two adjacent bezel portions being disposed to overlap each other in a front-rear direction of the display module, and
the connecting members includes:
  a first connecting member used in common for the two adjacent bezel portions and connecting the metal bracket and a first portion, in which a first through-hole is formed, of each of the two adjacent bezel portions, with the first connecting member passing through each of first through-holes, and with a gap existing between the metal bracket and each of first portions in the front-rear direction, the first through-hole being one of the plurality of through-holes of the bezel portion and being disposed at an outermost end in the longitudinal direction of the bezel portion; and
  second connecting members used for each of the two adjacent bezel portions, one of the second connecting members connecting the metal bracket and a second portion, in which a second through-hole is formed, of a corresponding one of the two adjacent bezel portions, with the one of the second connecting members passing through the second through-hole, and with no gap existing between the metal bracket and the second portion in the front-rear direction, the second through-hole being one of the plurality of through-holes of the bezel portion and being different from the first through-hole.
5. The display device according to claim 4, wherein
the first portion of one bezel portion of the two adjacent bezel portions and the first portion of an other bezel portion of the two adjacent bezel portions are connected to the metal bracket by the first connecting member, with the first portion of the one bezel portion and the first portion of the other bezel portion overlapping each other, and
the first connecting member connects the first portion of the one bezel portion, the first portion of the other bezel portion, and the metal bracket with a gap existing in the front-rear direction.
6. The display device according to claim 5, wherein
the first connecting member and the second connecting members are stepped screws,
each of the first connecting member and the second connecting members has an external thread configured to screw into the metal bracket at a tip, a shank being larger in diameter than the external thread, and a head being larger in diameter than the shank, a sum of thicknesses of the first portion of each of the two adjacent bezel portions is less than a length, in an axial direction, of the shank of the first connecting member, and a thickness of the second portion of each of the two adjacent bezel portions is equal to or larger than a length, in an axial direction, of the shank of each of the second connecting members.

7. The display device according to claim 4, wherein a gap between the second through-hole and a corresponding one of the second connecting members in a radial direction of the second through-hole is larger than a gap between the first through-hole and the first connecting member in a radial direction of the first through-hole.

8. The display device according to claim 4, wherein the metal bracket has a plurality of fixing holes into which the connecting members are fixed respectively, and a projection disposed at a position from a position of a corresponding one of the plurality of fixing holes to a position inside the display area, the projection projecting toward a corresponding one of the bezel portions, the corresponding one of the plurality of fixing holes being a fixing hole into which one of the second connecting members is fixed.

\* \* \* \* \*